United States Patent
Sauvageau et al.

(10) Patent No.: US 11,286,013 B2
(45) Date of Patent: *Mar. 29, 2022

(54) DYNAMIC TENSIONER LOCKING DEVICE FOR A TRACK SYSTEM AND METHOD THEREOF

(71) Applicant: SOUCY INTERNATIONAL INC., Drummondville (CA)

(72) Inventors: Yves Sauvageau, Drummondville (CA); Andre Leger, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 148 days.

This patent is subject to a terminal disclaimer.

(21) Appl. No.: 16/823,640

(22) Filed: Mar. 19, 2020

(65) Prior Publication Data

US 2020/0307727 A1 Oct. 1, 2020

Related U.S. Application Data

(63) Continuation of application No. 15/784,032, filed on Oct. 13, 2017, now Pat. No. 10,640,162, which is a
(Continued)

(51) Int. Cl.
*B62D 55/30* (2006.01)
*B62D 55/112* (2006.01)
(Continued)

(52) U.S. Cl.
CPC .......... *B62D 55/305* (2013.01); *B62D 55/112* (2013.01); *B60G 2300/32* (2013.01);
(Continued)

(58) Field of Classification Search
CPC ...... B62D 55/30; B62D 55/305; B62D 55/12; B62D 55/1125; F16H 7/1281; F16H 2007/0814
See application file for complete search history.

(56) References Cited

U.S. PATENT DOCUMENTS

| | | |
|---|---|---|
| 1,255,218 A | 2/1918 | Paulsen |
| 1,806,819 A | 5/1931 | Paulsen |

(Continued)

FOREIGN PATENT DOCUMENTS

| | | |
|---|---|---|
| CA | 2140600 A1 | 6/1996 |
| CA | 2188103 A1 | 4/1997 |

(Continued)

OTHER PUBLICATIONS

International Search Report from PCT/CA2015/050978 dated Dec. 22, 2015, Zarifa, Adeeb.

(Continued)

*Primary Examiner* — Kip T Kotter
(74) *Attorney, Agent, or Firm* — BCF LLP

(57) ABSTRACT

A track system comprising a dynamic tensioning device located between an idler wheel and the support frame as to apply proper tension in the track. The dynamic tensioning device is adapted to block at its current length upon the occurrence of a determined condition. The dynamic tensioner is adapted to substantially maintain its length when an acceleration and or deceleration of the track system reaches a predetermined value. For instance, such characteristic is relevant in an event of emergency braking. A dynamic tensioner would become contracted and the tension in the endless track would become too low. A low tension could cause the endless track to ratchet.

9 Claims, 19 Drawing Sheets

Related U.S. Application Data continuation of application No. 15/565,450, filed as application No. PCT/CA2016/050419 on Apr. 11, 2016, now Pat. No. 10,633,044, which is a continuation-in-part of application No. 15/515,197, filed as application No. PCT/CA2015/050978 on Sep. 29, 2015, now Pat. No. 10,343,734.

(60) Provisional application No. 62/146,140, filed on Apr. 10, 2015, provisional application No. 62/146,113, filed on Apr. 10, 2015, provisional application No. 62/057,110, filed on Sep. 29, 2014.

(51) Int. Cl.

| | | |
|---|---|---|
| B62D 55/096 | (2006.01) | |
| B62D 55/108 | (2006.01) | |
| B62D 55/15 | (2006.01) | |
| B62D 55/04 | (2006.01) | |
| F16H 7/12 | (2006.01) | |
| F16H 7/08 | (2006.01) | |
| B62D 55/14 | (2006.01) | |
| B62D 55/104 | (2006.01) | |
| B62D 55/12 | (2006.01) | |

(52) U.S. Cl.
CPC ............ *B62D 55/04* (2013.01); *B62D 55/096* (2013.01); *B62D 55/104* (2013.01); *B62D 55/108* (2013.01); *B62D 55/1125* (2013.01); *B62D 55/12* (2013.01); *B62D 55/14* (2013.01); *B62D 55/15* (2013.01); *F16H 7/1281* (2013.01); *F16H 2007/0814* (2013.01)

(56) References Cited

U.S. PATENT DOCUMENTS

| | | |
|---|---|---|
| 1,980,276 A | 11/1934 | Adolphe |
| 2,019,654 A | 11/1935 | Valentine |
| 2,041,599 A | 5/1936 | David |
| 2,093,456 A | 9/1937 | Knox |
| 2,386,620 A | 10/1945 | Graham |
| 2,442,354 A | 6/1948 | Gordon et al. |
| 2,458,549 A | 1/1949 | Bachman et al. |
| 2,467,947 A | 4/1949 | Skelton |
| 2,496,136 A | 1/1950 | Smith |
| 2,561,901 A | 7/1951 | Bachman et al. |
| 2,612,742 A | 10/1952 | Heth |
| 3,168,168 A | 2/1965 | Chorkey |
| 3,510,117 A | 5/1970 | Scholin et al. |
| 3,598,206 A | 8/1971 | Hennells |
| 3,603,423 A | 9/1971 | Schoonover |
| 3,693,767 A | 9/1972 | Johnson |
| 3,706,481 A | 12/1972 | Kramer |
| 3,774,708 A | 11/1973 | Purcell et al. |
| 3,841,424 A | 10/1974 | Purcell |
| 3,938,606 A | 2/1976 | Yancey |
| 4,044,865 A | 8/1977 | Tourunen |
| 4,519,654 A | 5/1985 | Satzler |
| 4,712,469 A | 12/1987 | Hesse |
| 4,840,437 A | 6/1989 | Henry et al. |
| 4,893,883 A | 1/1990 | Satzler |
| 4,923,257 A | 4/1990 | Purcell |
| 5,316,381 A | 5/1994 | Isaakson et al. |
| 5,340,205 A | 8/1994 | Nagorcka |
| 5,372,212 A | 12/1994 | Davis |
| 5,452,949 A | 9/1995 | Kelderman |
| 2,998,998 A | 10/1996 | Hyler et al. |
| 5,566,773 A | 10/1996 | Gersmann |
| 5,997,109 A | 12/1999 | Kautsch |
| 6,003,888 A | 12/1999 | Godbersen |
| 6,244,613 B1 | 6/2001 | Renger |
| 6,334,496 B1 | 1/2002 | Hiraki et al. |
| 6,401,847 B1 | 6/2002 | Lykken |
| 6,432,010 B1 | 8/2002 | Palonis et al. |
| 6,543,861 B1 | 4/2003 | Kahle et al. |
| 6,974,002 B2 | 12/2005 | Heideman |
| 7,556,130 B2 | 7/2009 | Lamoureux et al. |
| 7,597,161 B2 | 10/2009 | Brazier |
| 8,083,242 B2 | 12/2011 | Brazier |
| 8,291,993 B2 | 10/2012 | Juncker |
| 8,469,124 B2 | 6/2013 | Allaire |
| 8,640,797 B2 | 2/2014 | Allaire |
| 8,763,716 B2 | 7/2014 | Rosenbloom |
| 8,764,129 B2 | 7/2014 | Simula et al. |
| 10,124,843 B2 | 11/2018 | Sauvageau et al. |
| 10,633,044 B2* | 4/2020 | Sauvageau ............ B62D 55/305 |
| 10,640,162 B2* | 5/2020 | Sauvageau ............ B62D 55/305 |
| 2004/0026994 A1 | 2/2004 | Verheye et al. |
| 2004/0032107 A1 | 2/2004 | Timoney et al. |
| 2004/0099451 A1 | 11/2004 | Nagorcka et al. |
| 2005/0067239 A1 | 3/2005 | Bauer et al. |
| 2007/0029871 A1 | 2/2007 | Wake et al. |
| 2007/0087876 A1 | 4/2007 | Ward et al. |
| 2009/0072617 A1* | 3/2009 | Alfthan ................. B62D 55/305 305/146 |
| 2010/0237691 A1 | 9/2010 | Busley et al. |
| 2011/0315459 A1 | 12/2011 | Zuchoski et al. |
| 2012/0222908 A1 | 9/2012 | Mangum |
| 2012/0242121 A1 | 9/2012 | Ulrich |
| 2012/0242141 A1 | 9/2012 | Bessette et al. |
| 2012/0242142 A1 | 9/2012 | Kautsch et al. |
| 2012/0286565 A1 | 11/2012 | Marchildon et al. |
| 2013/0119753 A1 | 5/2013 | Pare et al. |
| 2014/0125118 A1 | 5/2014 | Nagorcka et al. |
| 2015/0266524 A1 | 9/2015 | Rackow et al. |
| 2016/0068205 A1 | 3/2016 | Hellholm et al. |
| 2017/0225727 A1 | 8/2017 | Sauvageau et al. |
| 2018/0086397 A1 | 3/2018 | Sauvageau et al. |
| 2018/0022408 A1 | 5/2018 | Sauvageau et al. |
| 2018/0118286 A1 | 5/2018 | Sauvageau et al. |
| 2018/0118287 A1 | 5/2018 | Sauvageau et al. |
| 2018/0118291 A1 | 5/2018 | Sauvageau et al. |

FOREIGN PATENT DOCUMENTS

| | | |
|---|---|---|
| CA | 2668234 A1 | 12/2009 |
| CA | 2832180 A1 | 5/2014 |
| DE | 29509006 U1 | 8/1995 |
| DE | 19919959 A1 | 11/2000 |
| DE | 102014003964 A1 | 9/2015 |
| EP | 2727803 A2 | 5/2014 |
| EP | 2921378 A2 | 1/2016 |
| GB | 570190 A | 6/1945 |
| GB | 2393696 A | 4/2004 |
| JP | 07142108 A | 6/1995 |
| WO | 2011154533 A1 | 12/2011 |
| WO | 2016049760 A1 | 4/2016 |
| WO | 2016161527 A1 | 10/2016 |

OTHER PUBLICATIONS

English abstract of DE 102014003964 retrieved from Espacenet on Mar. 29, 2017.
English abstract of JPH07142108 retrieved from Espacenet on Mar. 29, 2017.
English abstract of DE 19919959 retrieved from Espacenet on Mar. 29, 2017.
English abstract of EP 15150462 retrieved from Espacenet on Mar. 29, 2017.
English abstract of EP 2921378 retrieved from Espacenet on Mar. 29, 2017.
International Search Report from PCT/US2017/026701, dated Jun. 27, 2017, Blaine R. Copenheaver.
International Search Report from PCT/CA2016/050418 dated Jun. 22, 2016, Robert Gruber.
Supplementary International Search Report from PCT/US2017/026701, Aug. 16, 2019, Szaip, Andras.

(56) References Cited

OTHER PUBLICATIONS

International Search Report from PCT/CA2016/050419 dated Jun. 22, 2016, Robert Gruber.

* cited by examiner

DYNAMIC TENSIONER LOCKING DEVICE FOR A TRACK SYSTEM AND METHOD THEREOF

CROSS-REFERENCE TO RELATED APPLICATIONS

The present patent application claims the benefits of priority of U.S. Provisional Patent Application No. 62/146,113, entitled "Dynamic tensioner locking device for a track system", and filed at the United States Patent and Trademark Office on Apr. 10, 2015, the content of which is incorporated herein by reference.

FIELD OF THE INVENTION

The present invention generally relates to track systems and traction assemblies using tensioning devices used as wheel replacement for typically wheeled vehicles. More particularly, the present invention relates to track systems and traction assemblies comprising at least one blocking tensioning device for use on vehicles such as, but not limited to, farming and agricultural vehicles (e.g. tractors, harvesters, etc.) and construction and industrial vehicles (e.g. excavators, combines, forestry equipment, etc.) and power sports (ATV, UTV, etc.).

BACKGROUND OF THE INVENTION

Several normally wheeled vehicles and particularly heavy wheeled vehicles (e.g. farming tractors, front loaders, harvesters, etc.) often have their wheels replaced by track systems which use an endless traction band or track instead of a tire for propulsion or for steering. Vehicles equipped with track systems typically have improved floatation and traction, particularly when operated over soft terrains.

Endless tracks have been used on vehicles to increase surface area in contact with the ground. This increased vehicle footprint results in a lower force per unit area on the ground being traversed than a conventional wheeled vehicle of the same weight.

In a typical embodiment of an endless track system, an endless track is driven by a sprocket in which teeth of the sprocket engage links of the track to drive the track and the vehicle forward. Road wheels are attached to the vehicle through independent suspensions and roll over the track in contact with the ground. In such an embodiment, the road wheels typically do not drive the vehicle forward as only the sprocket is used for providing movement. The direct engagement of the sprocket does not allow for track slippage relative to the sprocket and/or due to friction between track and sprocket.

During operation, some components of the track systems, and more particularly the idler wheels and road wheels, can experience uneven load distribution, especially upon braking. Braking events generally prompt upward movement of the idler wheel which affects the tension of the endless track. This is particularly true for the idler wheels located toward the front of the track system. As upward movement of the idler wheels is generally desired when encountering varying obstacle, terrain variation and/or debris ingestion, the tracked vehicles are typically equipped with one or more tensioner devices adapted to substantially maintain the track at a predetermined tension in operation over various terrain profiles. Such tensioner device aims at avoiding that the track slides off the sprocket and/or idlers during a sudden manoeuvre or a turn. Typically, the tensioner device may as well prevent excessive load from being applied to the endless track, to the vehicle drive wheel, and to the vehicle suspension.

Additionally, track tension may impact the power efficiency. In some situation, an over tightened or under tightened track may lead to power loss from excess friction and may accelerate the wear of the track system. However, radially upward movement of the idler wheel upon braking must be restrained as tension of the track is decreased, thus loosening the endless track leading to ratcheting of the track. As such, decreased tension in the endless track upon braking hinders the proper functioning of the track system and decreases the braking efficiency of the track system. Furthermore, upward movement of the idler wheel upon braking increases wearing of the track system, in part due to ratcheting but also due to the overall deformation of the track system. As such, the tensioner in the track system aims at maintaining the perimeter defined by the wheels generally equal or superior to the nominal perimeter of the track.

Track tension is typically controlled by moving a sprocket or idler wheel that engages the track. A conventional passive mechanism for moving the sprocket or idler wheel is a track tensioner employing a grease-filled cylinder or an oil filled cylinder using an accumulator acting as a spring which is referred to as a dynamic tensioner. A piston in the cylinder moves as grease is added or removed through a fitting. By it's motion, the piston move the sprocket or idler wheel relative to the track thereby causing the sprocket or idler wheel to either extend into the track path and increase the tension of the track or to withdraw from the path of the track and decrease the tension of the track.

Indeed, in track systems, the resultant force from the traction band tension and the traction band friction can induce a torque around the idler frame pivot, resulting in the rotation of the idler frame thereabout. This rotation then generally causes the idler wheel located at one end of the idler frame to move circularly about the radius of the idler frame pivot point, while causing the road wheels located at the other end of the tandem frame to move in the opposite direction circularly about the radius of the idler frame pivot point, resulting in an increased load on the wheels which are urged against the ground. The rotation of the idler frame can also cause the trailing portion of the track system to rise. This uneven load distribution can reduce the efficiency of the track system and even lead to premature failure thereof.

Moreover, some safety regulations in countries require that agricultural tracked vehicles be able to immobilize themselves from a given speed within a certain distance and/or meet a deceleration value. Those requirements are such that current mechanism are inefficient if not deficient at avoiding the ratcheting phenomenon as described above.

Hence, there is a need for an improved track system having a dynamic or active track tensioner which may mitigate at least some shortcomings of prior art track systems.

The required tensioner shall be able to allow rotational movement of the front wheel when the vehicle is in normal operation mode and be able to block, or limit such movement in a braking event to avoid or at least limit the ratcheting of the sprocket wheel or drive wheel.

Rear suspensions for mountain bike face similar issues as the suspension tends to compress when the user pedals, thus the compression is reducing the efficiency of the pedaling. Solutions have been developed to adjust the damping of the suspension in relation with the of the shock force applied on the suspension. An example of a solution may be found in U.S. Pat. No. 8,770,360 in which an inertial valve is used to modulate the damping of the suspension element. However, such solution provides a mean to maintain the suspension blocked during operation and to unlock the suspension element when an obstacle is hit. Furthermore, such solutions are configured to absorb a limited shock or force.

SUMMARY OF THE INVENTION

A track system in accordance with the principles of the present invention which may mitigate at least some of the shortcomings of prior track systems by having a dynamic tensioning device adapted to selectively hamper tensioner compression upon occurrence of selective directional force.

Hence, a track system in accordance with the principles of the present invention generally comprises a drive wheel configured to be mounted to an axle of a vehicle, a support frame (or support frame assembly) configured to be mounted to the vehicle, front and rear idler wheels, typically respectively mounted at the front and at the rear of the track system, road wheels, typically mounted longitudinally between the idler wheels, and an endless traction band disposed about the drive wheel, the idler wheels and the road wheels.

The traction assembly comprises a traction band dynamic tensioning system mounted to the support frame and configured to controllably tension the traction band around the wheels of the traction assembly.

In accordance with an aspect of the present invention, a dynamic blocking tensioning device is attached to the support frame and bias an idler wheel so as to impart a force on the endless track to maintain an optimal track tension, decreasing endless track slippage relative to the drive wheel, idler wheels and road wheels, allowing for optimal track movement along all types of terrain and in combination with a preferred increased vehicle footprint, increasing the overall vehicle traction and mobility of the vehicle.

The dynamic blocking tensioning device is typically mounted at the front or at the rear of the support frame such as to operatively bias the front idler wheels or the rear idler wheels against the track. As such, the tensioner applies the required tension to the track while allowing for some flexibility upon encountering obstacles or terrain variations while having the ability to block or lock tensioning upon the occurrence of target directional forces.

In accordance with an aspect of the present invention, a tensioning device comprises an actuator, a fluid tank in fluid communication with the actuator through a tank return flow path, an accumulator in fluid communication with the actuator through an accumulator flow path, whereby an inertia valve is operatively connected to the fluid flow path as to impede or block the flow upon the occurrence of a directional or inertial force applied to the track system or tracked vehicle.

In accordance with the principles of the present invention, the tensioning device exerts a variable force on the endless track in order to increase, decrease, or maintain endless track tension as needed in a dynamic manner. When the variable force is increased, the endless track will achieve a greater tension around the wheels and decrease track slippage relative to the drive wheel. When the variable force is decreased, the endless track will achieve a lower tension around the wheels. Decreasing track tension, especially when increased track tension is not needed, may also reduce wear of the mating components.

In accordance with the principles of the present invention the dynamic tensioner locking device for a track system is preferably located between an idler wheel and the support frame. Alternatively the dynamic tensioner locking device for a track system may be situated between the support frame and a support member operatively connected to the idler wheel so long as the resulting tensioner effect is to bias the idler wheel as to apply a desired tension to the endless track of the track system.

In accordance with the principles of the present invention the dynamic tensioner locking device for a track system comprises an inertial valve configured to obstruct or at least impede the fluid, preferably hydraulic fluid, from flowing between an actuator/cylinder chamber and a fluid tank/reservoir or accumulator, thus preventing the application of a variable tension to the track system upon occurrence of target directional force. An exemplary directional force may be the inertial force resulting from braking of the tracked vehicle. In such example, upon braking of the tracked vehicle, the inertial force will direct an obstructing member, such as a ball, or cylinder, preferably made from metallic material through the fluid flow path, thus impeding or blocking the fluid flow and preventing the variation of the tensioner. For some vehicle, the force applied on the blocking apparatus may be significant. Accordingly, the system may be adapted to reduce the flow of fluid instead of totally blocking the flow to avoid failure. The blocking device, such as the ball, or valve, may thus be positioned in two or more positions as to offer better granularity in the flow control.

As the flow of fluid will be blocked or reduced between the cylinder and the inertial valve, the length of the tensioner shall remain locked or constant as to allow the idler wheel to apply tension on the track by avoiding an inward displacement of the idling wheel within the traction assembly.

Alternatively, according to another aspect of the present invention, the vehicle brake could be connected to a solenoid and trigger blocking of the tensioner as to electronically result in the blocking of the variable tension application.

In accordance with another aspect of the present invention, dynamic tensioner locking device for a track system comprises a piston rod carrying a piston and a tube defining a piston chamber. The piston is configured for reciprocal movement within the piston chamber. A reservoir chamber is defined by the tensioner and includes a divider configured to move to vary a volume of the reservoir chamber to accommodate fluid displaced from the piston chamber by the piston rod. The dynamic tensioner locking device for a track system also includes a fluid passage connecting the piston chamber and the reservoir chamber and a valve having a first position and a second position. The valve preferably permits a first rate of fluid flow through the flow passage in the first position and the valve permits a second rate of fluid flow through the flow passage in the second position. Movement of the divider moves the valve between the first and second position. The valve may also offer more than two positions to offer better granularity.

In accordance with another aspect of the present invention, the dynamic tensioner locking device for a track system comprises a tube and a piston rod carrying a piston for reciprocal movement within the tube. The piston and the tube define a first fluid chamber. A second fluid chamber is defined by the damper. The dynamic tensioner locking device for a track system also comprises a first valve configured to move between a first position and a second position in response to an increase in the volume of fluid within the second chamber and a second valve configured to move between a first position and a second position in response to a deceleration force applied to the tensioner.

In accordance with another aspect of the present invention, a tensioning device comprises an actuator or cylinder and piston, a fluid tank also referred to as an accumulator in fluid communication with the actuator through a tank return flow path, whereby an inertia valve is operatively connected to the fluid flow as to impede the flow upon the occurrence of a directional or inertial force applied to the track system.

In accordance with another aspect of the present invention, a method including the steps of determining a desired tension of the track on the track vehicle, generating a fluid pressure through the rotation of an idler wheel on said tracked vehicle, increasing the tension of the track of the tracked vehicle by extension of the idler wheel with said fluid pressure, decreasing a tension of the track of the tracked vehicle by retraction of the idler wheel through a relieve of said fluid pressure, reversibly hampering or reversibly obstructing the dynamic tension adjustment using an inertial valve interrupting fluid flow between the accumulator and fluid tank.

In accordance with the principles of the present invention, a method including the steps of determining a desired tension of the track on the track vehicle, generating a fluid pressure through the rotation of an idler wheel on said tracked vehicle, increasing the tension of the track of the tracked vehicle by extension of the idler wheel with said fluid pressure, and decreasing a tension of the track of the tracked vehicle by retraction of the idler wheel through a relieve of said fluid pressure, dynamically blocking the tensioner upon the occurrence of a selected directional force.

The invention is directed to a track system for a vehicle, the track system comprising a drive wheel operatively mounted to the vehicle, a support frame, an idler wheel pivotally mounted on the support frame; an endless track disposed around the drive wheel, and the idler wheel, the endless track defining an overall perimeter of the track system and a dynamic tensioner attached between the idler wheel and the support frame, the dynamic tensioner being adapted to substantially maintain the length of the dynamic tensioner when an acceleration of the track system reaches a predetermined value.

In accordance with the principles of the present invention, the dynamic tensioner may be a fluid-based suspension element fluidly connected to a reservoir of fluid. The dynamic tensioner comprises a mean adapted to limit a displacement of fluid between the fluid-based suspension element and the reservoir when the acceleration of the track system reaches the predetermined value. The fluid-based suspension element may comprise a hollow portion adapted to slidingly receive a piston, the hollow portion defining a chamber between the piston and a closed end of the hollow portion.

Still in accordance with the principles of the present invention, the mean adapted to limit a flow of fluid comprises a moving element adapted to obstruct, or partially obstruct the fluid path between the chamber and the reservoir.

In accordance with the principles of the present invention, the mean adapted to limit a flow of fluid may be an inertial valve, or an active flow control mean, such as but not limited to, a solenoid.

The active control mean is triggered by a signal. The signal may be generated by a switch, or an accelerometer. Accordingly, a controller may be required to translate the signal to be used by the solenoid.

In accordance with the principles of the present invention, the dynamic tensioner may be fluidly connected to a fluid device adapted to change a quantity of fluid contained in the reservoir. This may help adjusting the length of the tensioner. The fluid device, such as but not limited to, a hydraulic pump, may be triggered by a sensor.

In accordance with the principles of the present invention, a security system, such as a release valve, may be fluidly connected to the system to relieve excess pressure.

The invention is further directed to a method for controlling a tension in an endless track disposed around a plurality of wheels pivotally mounted on a support frame of a track system, the track system being operatively mounted to a vehicle, at least one of the plurality of wheels being operatively mounted to a dynamic tensioner, the dynamic tensioner being operatively mounted on the support frame, the method comprising the step of substantially maintaining the length of the dynamic tensioner when an acceleration of the track system reaches a predetermined value.

In accordance with the principles of the present invention, the method may comprise the step of determining the acceleration of the track system. The method may also comprise the steps of limiting a flow between a fluid-based suspension element and a reservoir for substantially maintaining the length of the dynamic tensioner if the acceleration reaches the predetermined value; and allowing a flow between the fluid-based suspension element and the reservoir for allowing variation of the length of the dynamic tensioner if the acceleration is below the predetermined value.

Still in accordance with the principles of the present invention, the method may further comprise the steps of adding fluid in the reservoir for increasing track tension if the acceleration reaches a predetermined value; and removing fluid in the reservoir for allowing variation of the length of the dynamic tensioner if the acceleration is below the predetermined value.

The method may further comprise the step of obtaining the signal from an accelerometer or a general switch.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel dynamic tensioner locking device for a track system will be described hereinafter. Although the invention is described in terms of specific illustrative embodiments, it is to be understood that the embodiments described herein are by way of example only and that the scope of the invention is not intended to be limited thereby.

Figure 1:
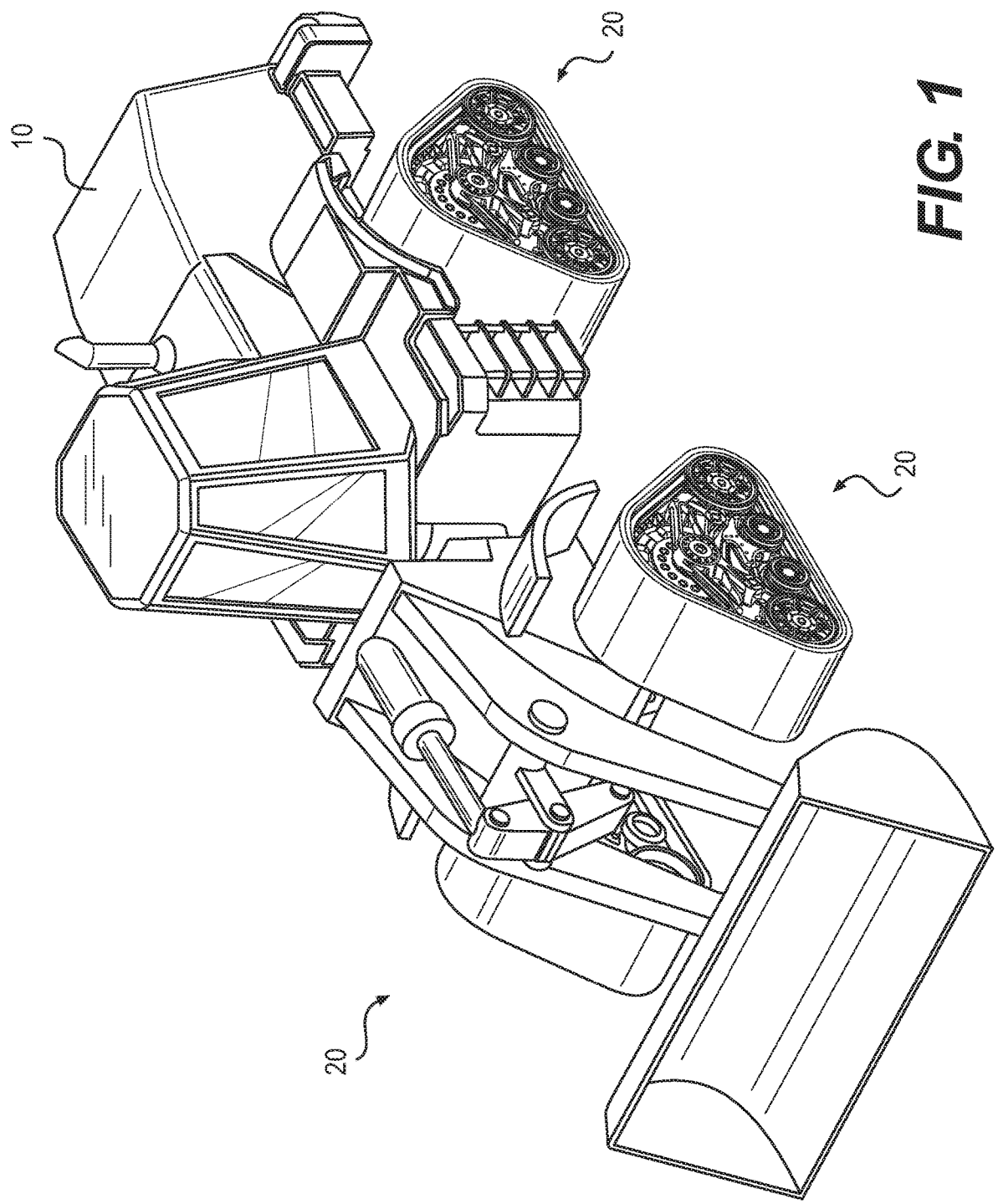
FIG. 1 is a perspective view of a vehicle having mounted thereto four track systems in accordance with the principles to the present invention.

Referring first to FIG. 1, a typical embodiment of an endless track system 20 is shown. The FIG. 1 shows four (4) endless track systems each mounted to a vehicle 10. The vehicle 10 is a front-loader typically used in the area of construction. The track systems 20 are used to replace the wheels which are typically used on such vehicle 10.

Figure 2:
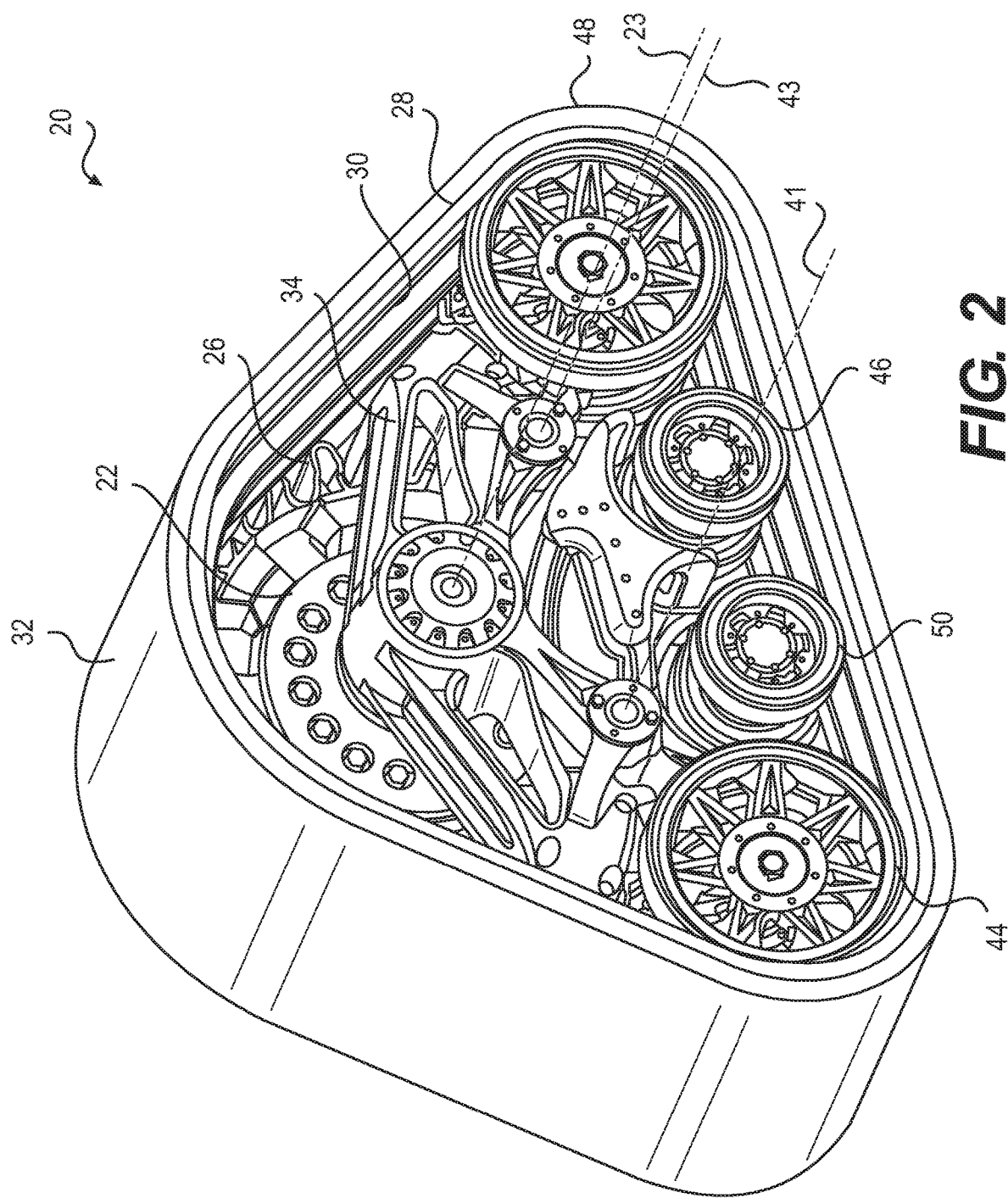
FIG. 2 is a perspective view of one of the track system of FIG. 1.
Figure 3:
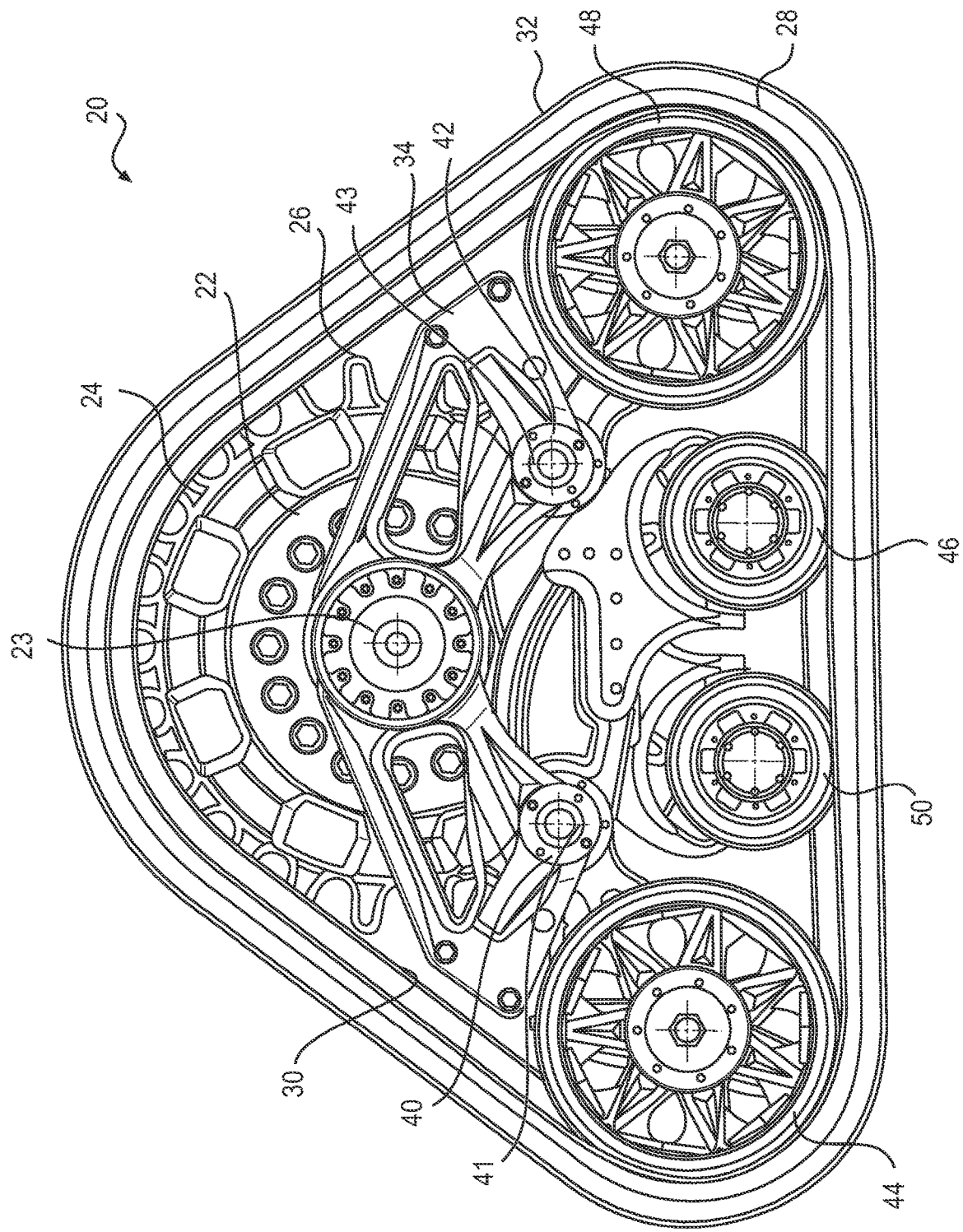
FIG. 3 is a side view of the track system of FIG. 2.
Figure 4:
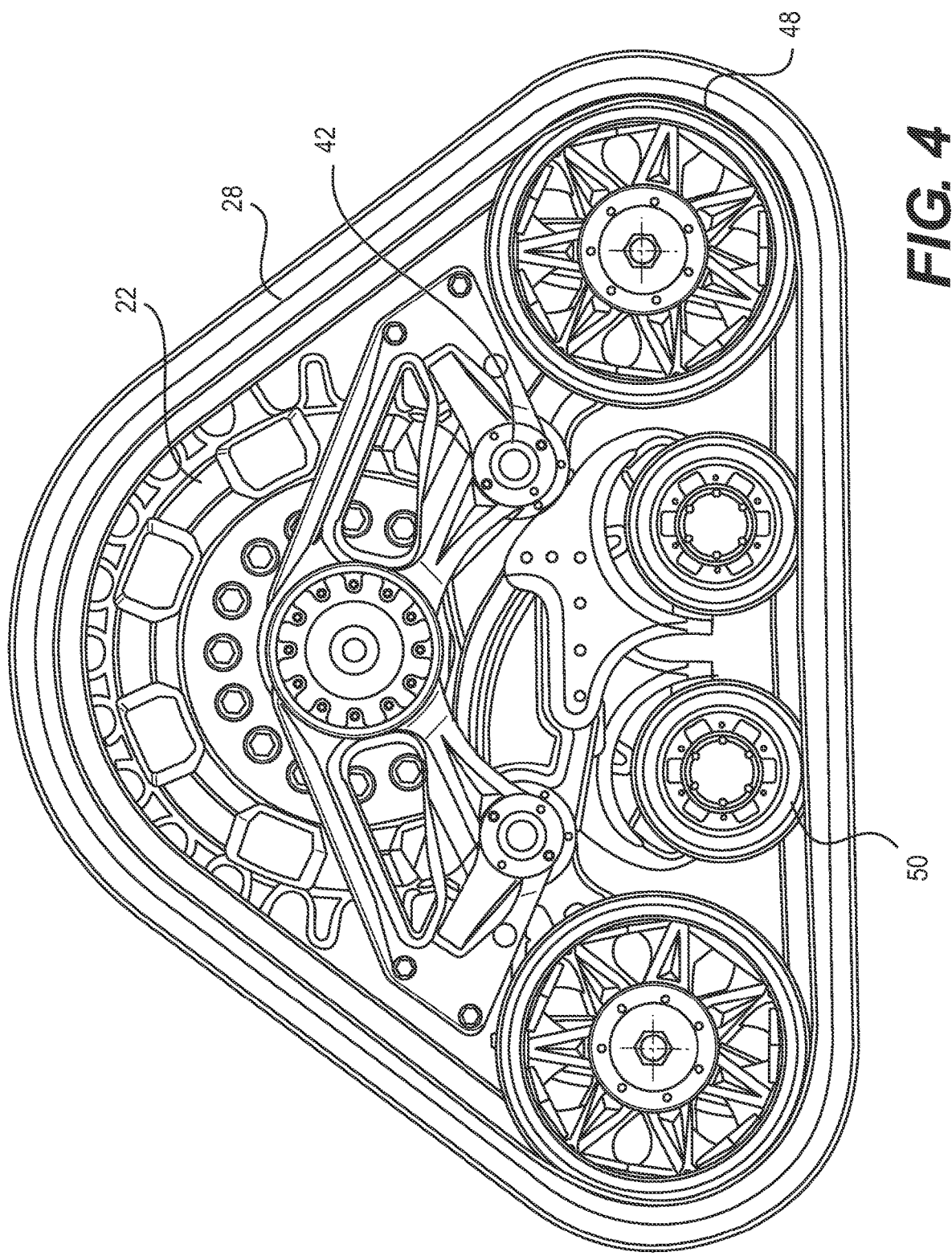
FIG. 4 is a side view of the track system of FIG. 2.

Referring now to FIGS. 2 and 3, a typical embodiment of an endless track system 20 is shown. In such a typical endless track system, the track system 20 comprises a drive wheel 22 configured to be mounted to the axle (not shown) of the vehicle 10. The drive wheel 22 defines a rotation axis 23 about which it rotates. The drive wheel 22 comprises, along its periphery 24, a plurality of evenly disposed sprocket teeth 26 configured to engage drive lugs (not shown) located on the inner surface 30 of the traction band 28. In the present embodiment, the drive wheel 22 is a sprocket wheel.

The track system 20 typically comprises a frame assembly 34 pivotally mounted to the drive wheel 22. In the present example of endless track system, the frame assembly 34 is pivotally mounted to the drive wheel 22. Understandably, in other embodiments, the frame assembly 34 could be configured to be mounted to the vehicle 10 using other mounting method, such as replacing the final drive or mounting the track system on a free rotating shaft of the vehicle. In yet other embodiments, the frame assembly 34 may comprise an attachment frame or assembly configured to secure the frame assembly 34 to the vehicle 10.

Typically, the endless track system 20 comprises at least one idler wheel which is pivotally mounted with regard to the frame assembly 34. In the present example, a front pivoting point 40 defines a rotation axis 41 while a rear pivoting point 42 defines a rotation axis 43. As best shown in FIG. 3, the rotation axis 41 is longitudinally located in front of the drive wheel rotation axis 23 while the rotation axis 43 is located longitudinally behind the drive wheel rotation axis 23.

In other embodiment, the idler wheel 44 may be pivotally mounted on a tandem structure with one or more road wheels 46 or 50, which tandem structure is pivots with regard to the frame assembly 34.

The track system 20 also comprises a traction band or endless belt 28 disposed about the drive wheel 22, the idler wheels 44 and 48 and the road wheels 46 and 50. The traction band 28 is typically made from reinforced elastomeric material and comprises an inner wheel-engaging surface 30 and an outer ground-engaging surface 32.

Though not shown in the figures, the outer surface 32 of the traction band 28 typically comprises traction lugs configured to engage the terrain over which the track system 20 is operated.

Figure 5:
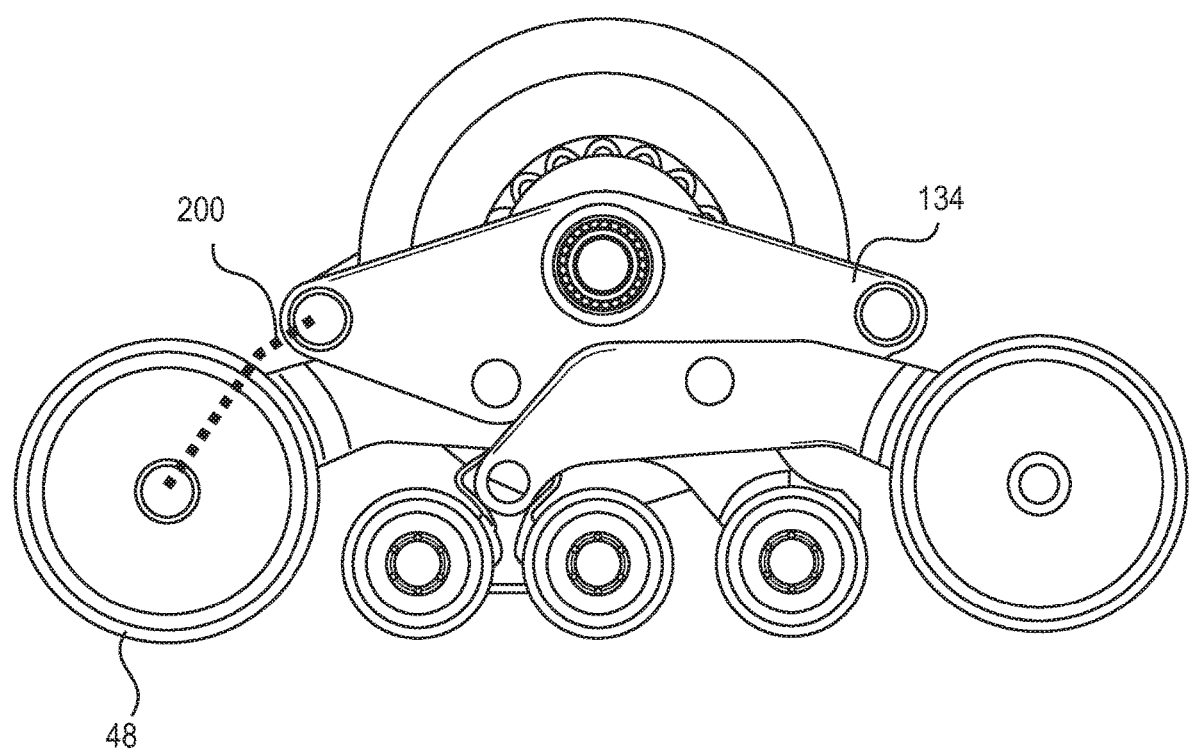
FIG. 5 is a side view of another embodiment of a track system in accordance with the principles to the present invention, without the endless traction band having the dynamic tensioner locking device installed thereto.
Figure 9:
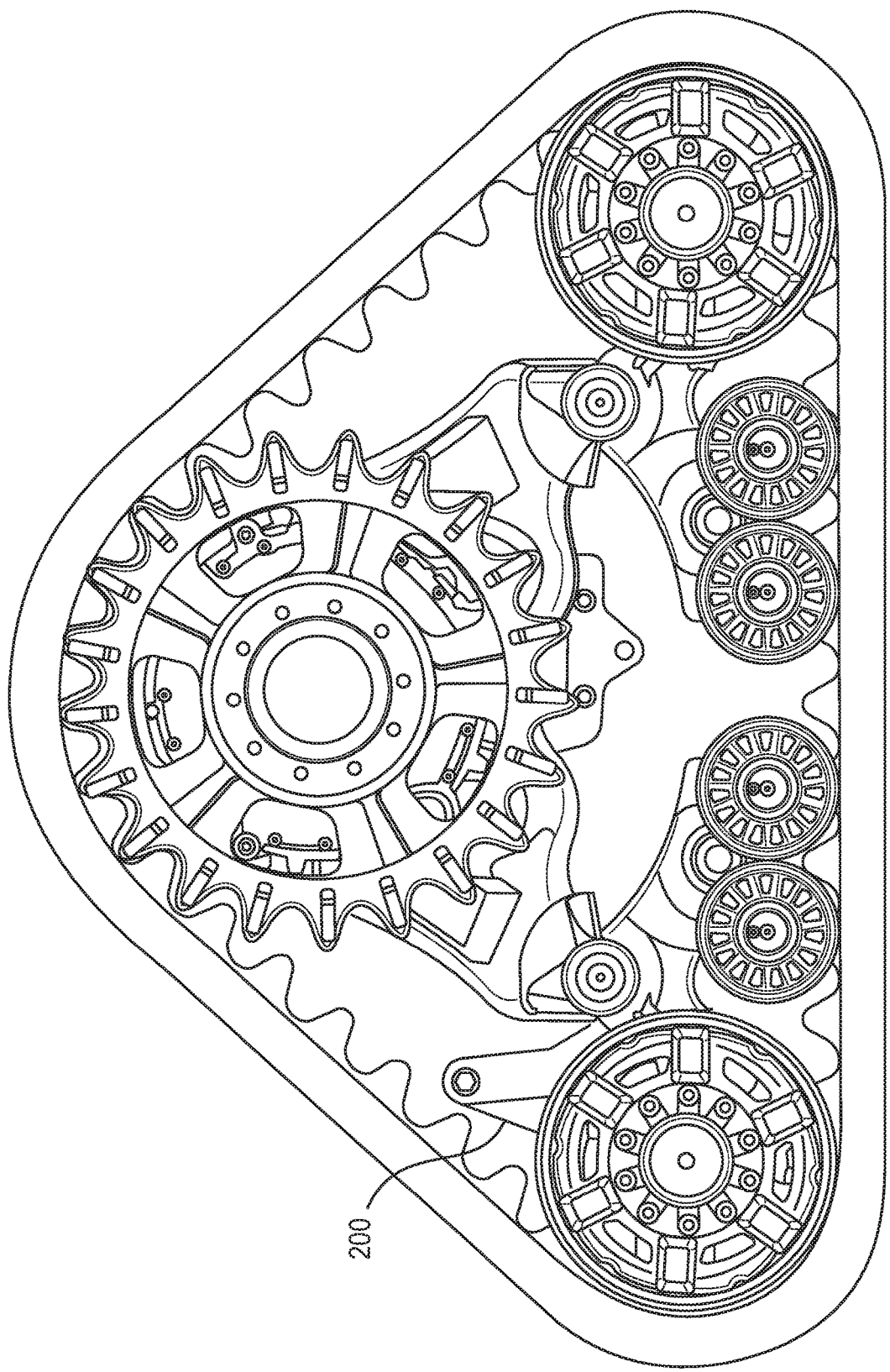
FIG. 9 is a side view of another embodiment of a track system in accordance with the principles to the present invention, having the dynamic tensioner locking device installed thereto.

Now referring to FIG. 5, an example of a tracked vehicle having a dynamic tensioner locking device 200 operatively connected to an idler wheel 48 and to the frame assembly 134 is shown. A typical tensioner device is generally embodied as a damper or cylinder which ensures that the displacement of the idler wheel with regard to the frame assembly is limited or allows re-positioning of the idler wheel in a position to provide tension in the endless track within a range of predetermined values. Another embodiment of a track system having a dynamic tensioner locking device 200 is shown in FIG. 9.

Now referring to FIGS. 6A-6F and 7, an embodiment of a dynamic tensioner locking device 200 for a track system is shown at various time of an event of inertial force, such as a hard braking event. It shall be understood that the FIGS. 6A-6F and 7 are schematic diagram and that certain components were removed for the sake of clarity. The dynamic tensioner locking device 200 of this embodiment preferably comprises a fluid-based suspension element 200*a* including a cylinder 206. The cylinder 20 typically comprises a plunger or piston 208 hermetically or sealingly inserted in a chamber 210. The cylinder 206 is in fluid communication with a fluid reservoir or accumulator 204 using any connecting member such as a conduit 224. The connecting member 224, the interior chamber, or compression chamber 210 and the reservoir 204 comprise a liquid fluid, such as oil, and a compressible gas fluid, such as nitrogen ($N_2$). The piston 208 is slidingly engaged with an interior surface of the chamber 210. Understandably, any other type of fluid-based suspension element may be used without departing from the principles of the present invention.

As the force on the tensioning device 200 is increased, the piston 208 moves toward a closed opening of the cylinder, the liquid fluid is pushed in the connecting member 224 and the reservoir 204. The portion between the piston 208 and the closed end of the cylinder is known as the compression chamber 210. As the piston 208 is pushed in the cylinder 206, the taken volume of the piston is pushed in the reservoir. As a result, the fluid reservoir 204 is typically provided to act as a spring by receiving the fluid in excess.

Thus, the reservoir chamber 204 acts as an accumulator that accepts excess tensioning fluid upon compression of the tensioner 212. The fluid is then returned to the compression chamber 210 upon expansion of the tensioner piston 208. Although the illustrated reservoir chamber 204 is defined by a separate structure from the main tensioner body 206 (a round reservoir, in this instance), in other arrangements the reservoir 204 and tensioner body may share common structural components. Furthermore, other suitable compensation mechanisms may also be used.

In the illustrated arrangement, the reservoir chamber 204 comprises two types of fluid, such as, but not limited to, hydraulic oil and nitrogen. The connecting member conduit 224 comprises an inertial blocking mechanism 228, such as an inertial valve 228. The inertial blocking mechanism blocks or at least limits the flow of the fluid upon an inertial event, such as hard braking. Understandably, any inertial blocking mechanism allowing the tension to be maintained may be used. Typically, an inertial valve 228 comprising a valve body 214, an inertia actuator 216, and a biasing member 218 operatively biasing the inertia actuator 216 in an initial and inoperative position.

The inertia actuator may be embodied as a ball or elongated member 216, preferably made from metallic material to impart a significant mass to the inertia actuator. Understandably any type of suitable inertial valve configured to block or limit the flow of a fluid upon occurrence of a selected force could be used without departing from the principle of the present invention.

Also, the dynamic tensioner 200 is typically configured to block or substantially reduce the flow at a predetermined offload or force. In operation, when an inertial force is applied, the inertial actuator 216 completely or partially moves across the connecting member, thus blocking or limiting the flow between the reservoir and the chamber. As a result of the flow of the liquid fluid being blocked, the piston 208 may not further move within the chamber as the compressibility of the fluid liquid is very low or null. As a result of the flow of the liquid fluid being limited, the movement of the piston 208 within the chamber is slowed or stopped. On the other end, the piston 208 is pushed and moves the fluid by the force applied on the idler wheel as a result of a braking event. At this point, the length of the tensioner remains generally locked or constant as to prevent the idler wheel to move inwardly within the track system or slow down the inward movement of the idler wheel.

Broadly, the tensioner 212 provides movement between the idler wheel and the frame of the track system. Such movement is useful to maintain the tension of the track upon crossing obstacle and uneven terrain and/or ingesting debris. In some embodiments having suspension elements, the movement between the idler wheel and the frame limits tension variation when components are moving. The locking of the tensioner occurs only upon triggering of the inertial valve. Typically, the tensioner shall be blocked when a hard braking event occurs. It should be noted that the floating piston may be replaced by other suitable separating structures (such as a flexible diaphragm, for example). Furthermore, a reservoir sealing cap desirably includes a valve (not shown) which allows the pressure within the reservoir chamber 204 to be adjusted. In some arrangements, the gaseous fluid component, i.e. the nitrogen 230, may be replaced by an alternative compressible material, such as a member formed of compressible closed-cell foam, for example.

Figure 6A:
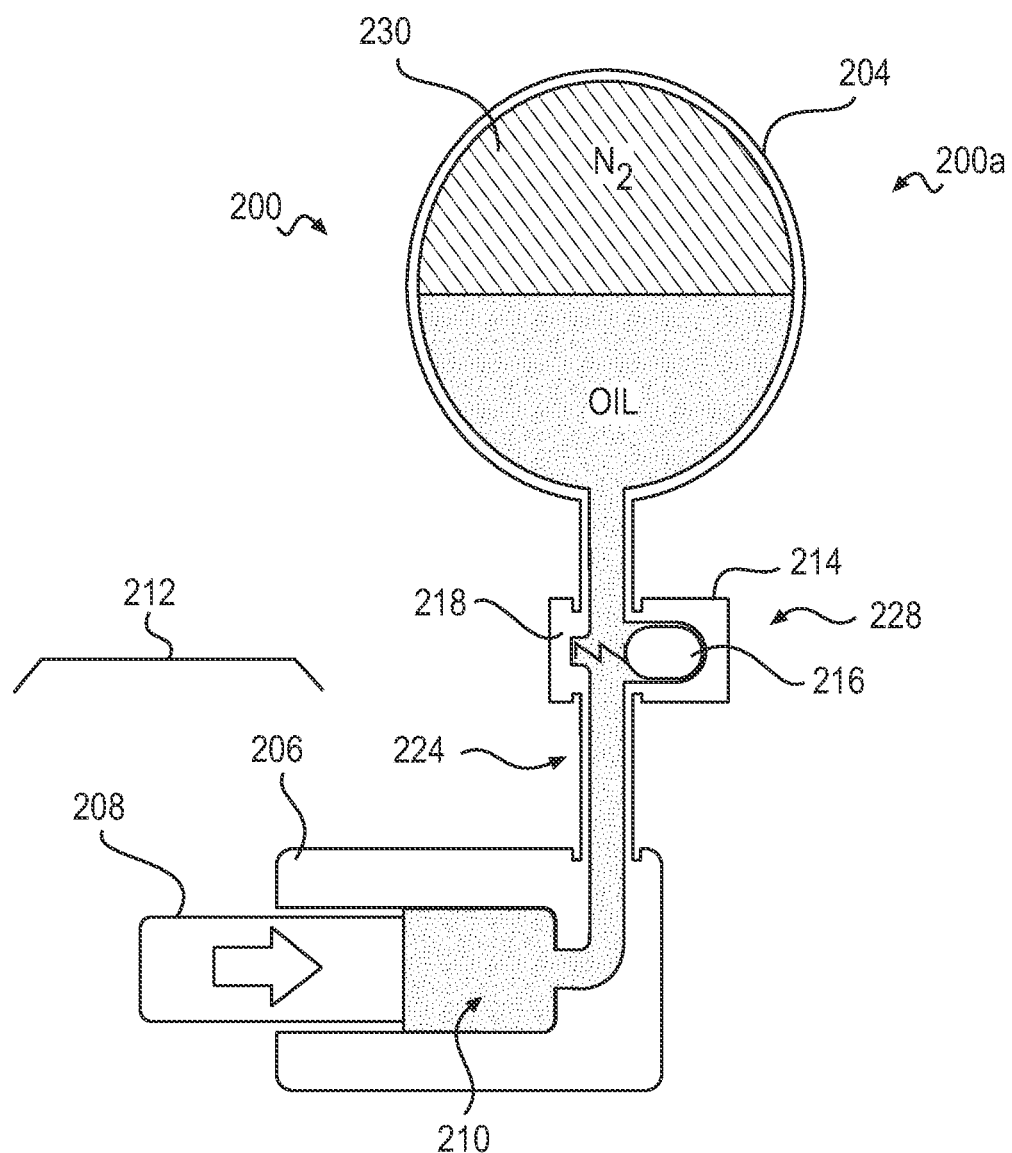
FIG. 6A-F is a schematic view of an exemplary dynamic tensioner locking device for a track system in accordance with the principles to the present invention.
Figure 6B:
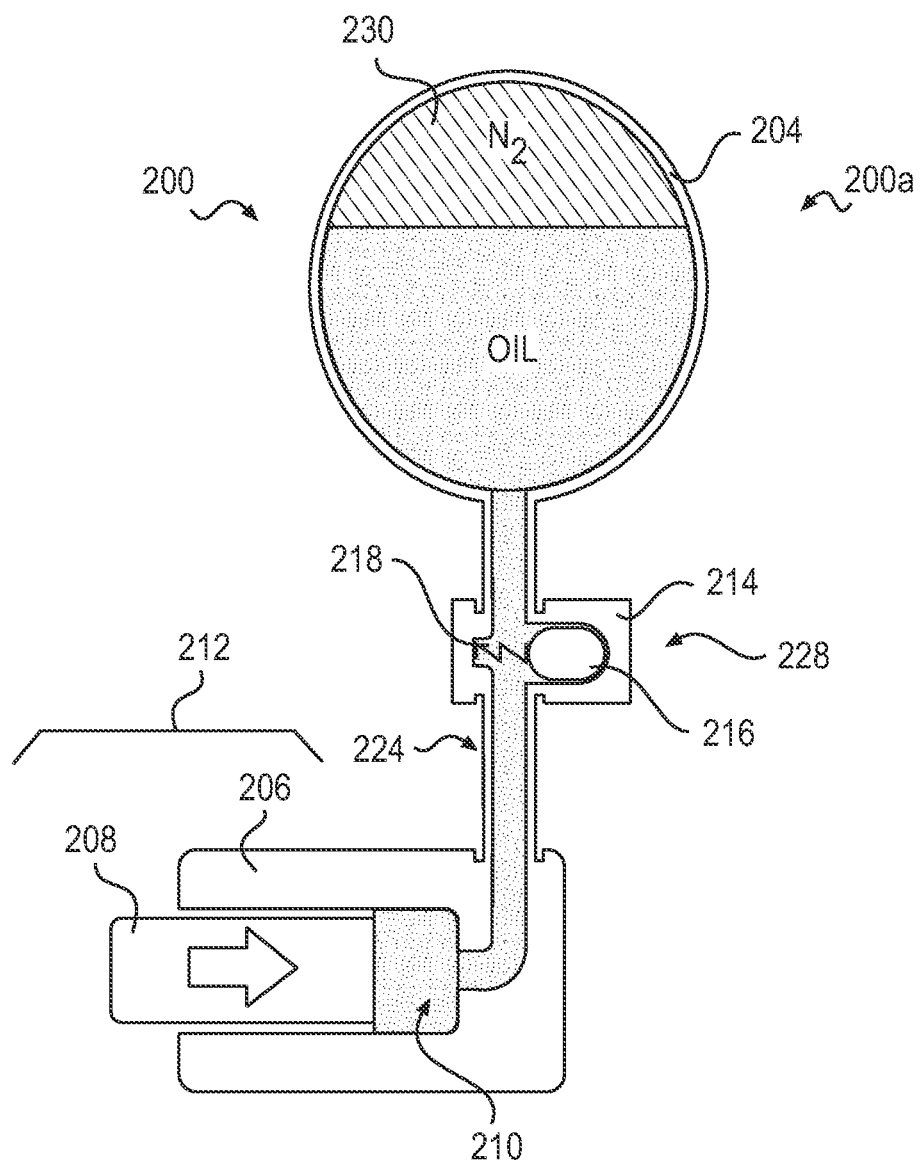
Figure 6C:
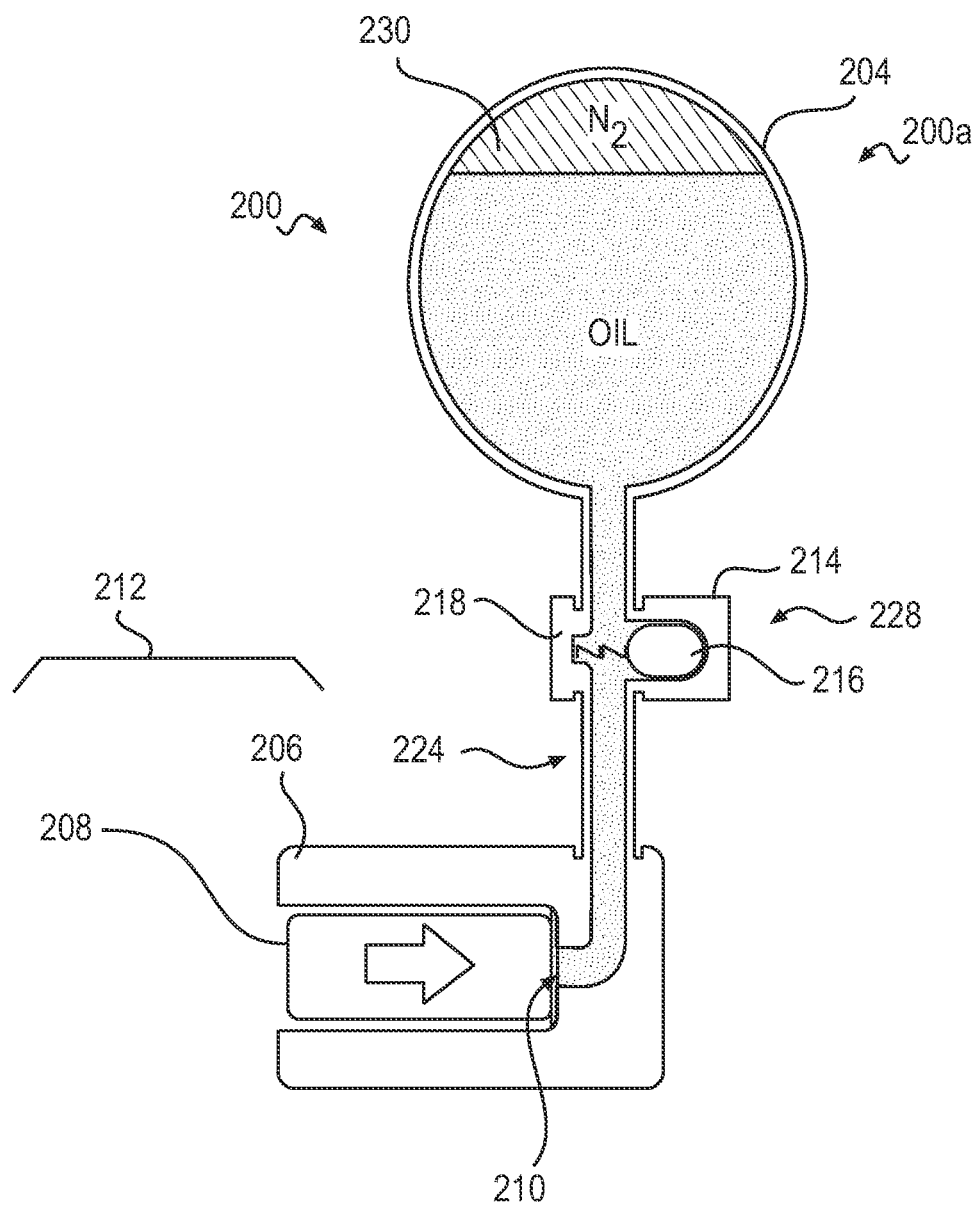
Figure 6D:
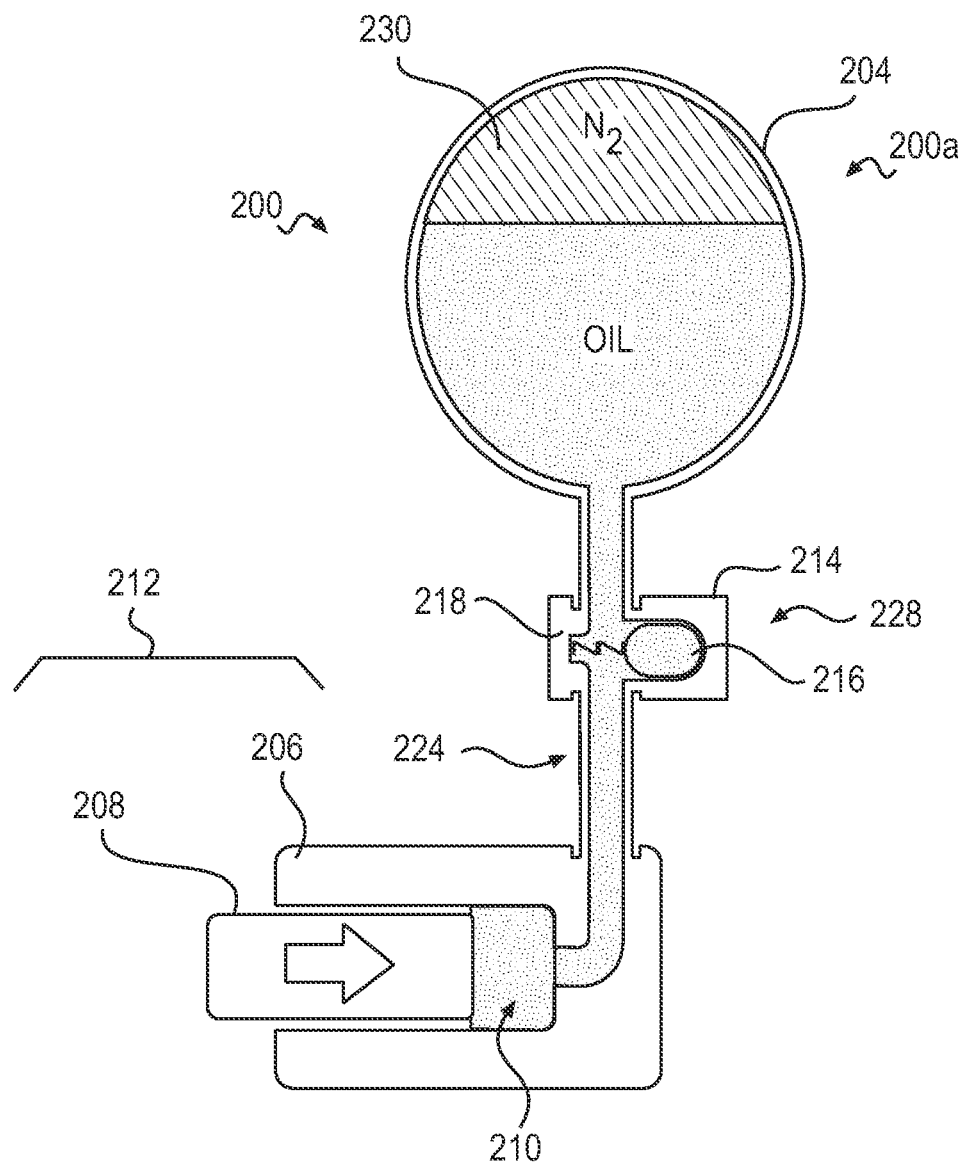

Now referring to FIG. 6A, a schematic representation of the dynamic tensioner locking device 200 for a track system is shown at an initial tension level. In operation, in response to terrain variations or the presence of obstacles, the piston 208 is allowed to move within the cylinder 206 thus slightly decreasing the tension applied to the endless track (FIGS. 6A-C). FIGS. 6B and 6C illustrate the event where the piston is further moved within the cylinder. Likewise, when the terrain conditions are back to normal, the piston returns to its initial position (FIG. 6D).

Figure 6E:
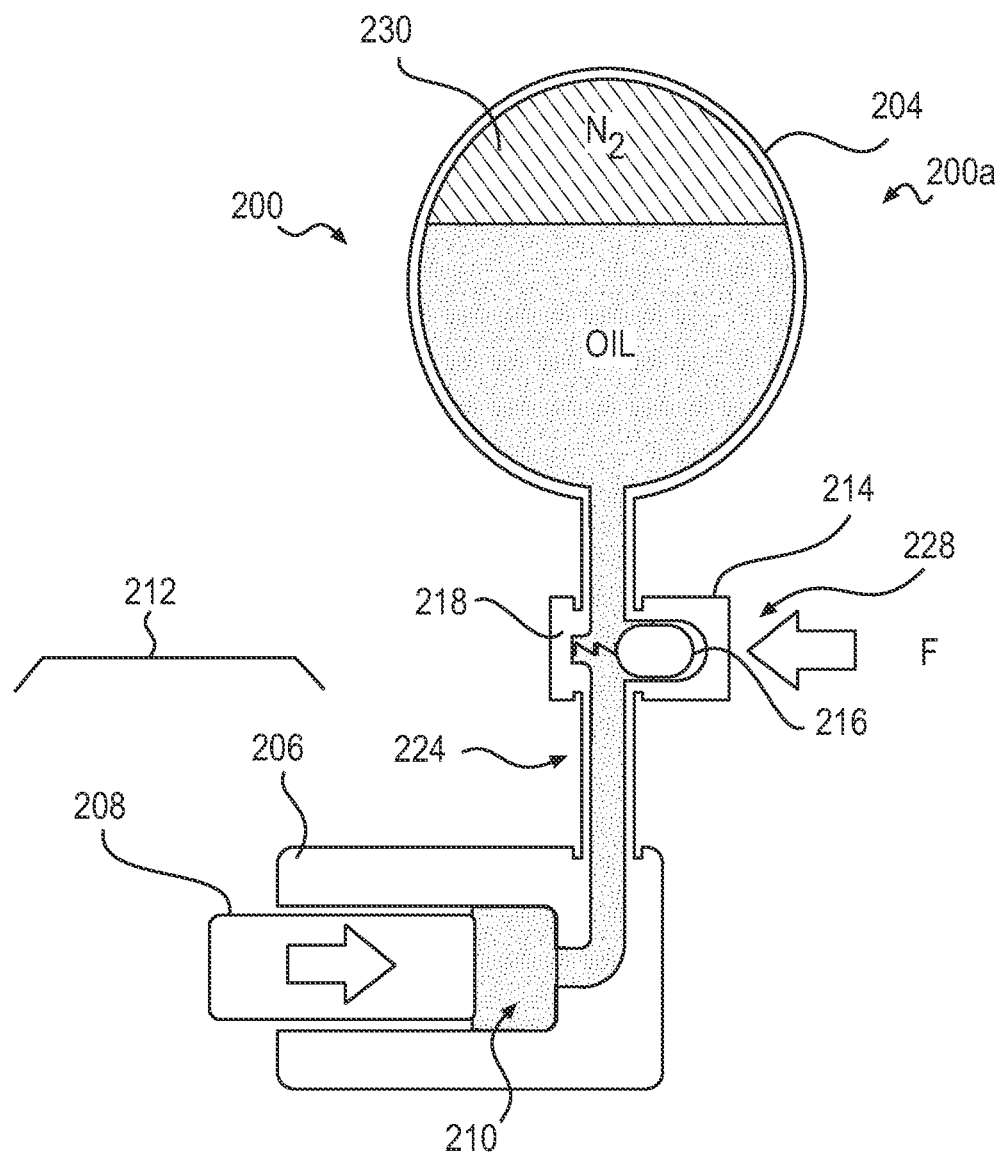
Figure 6F:
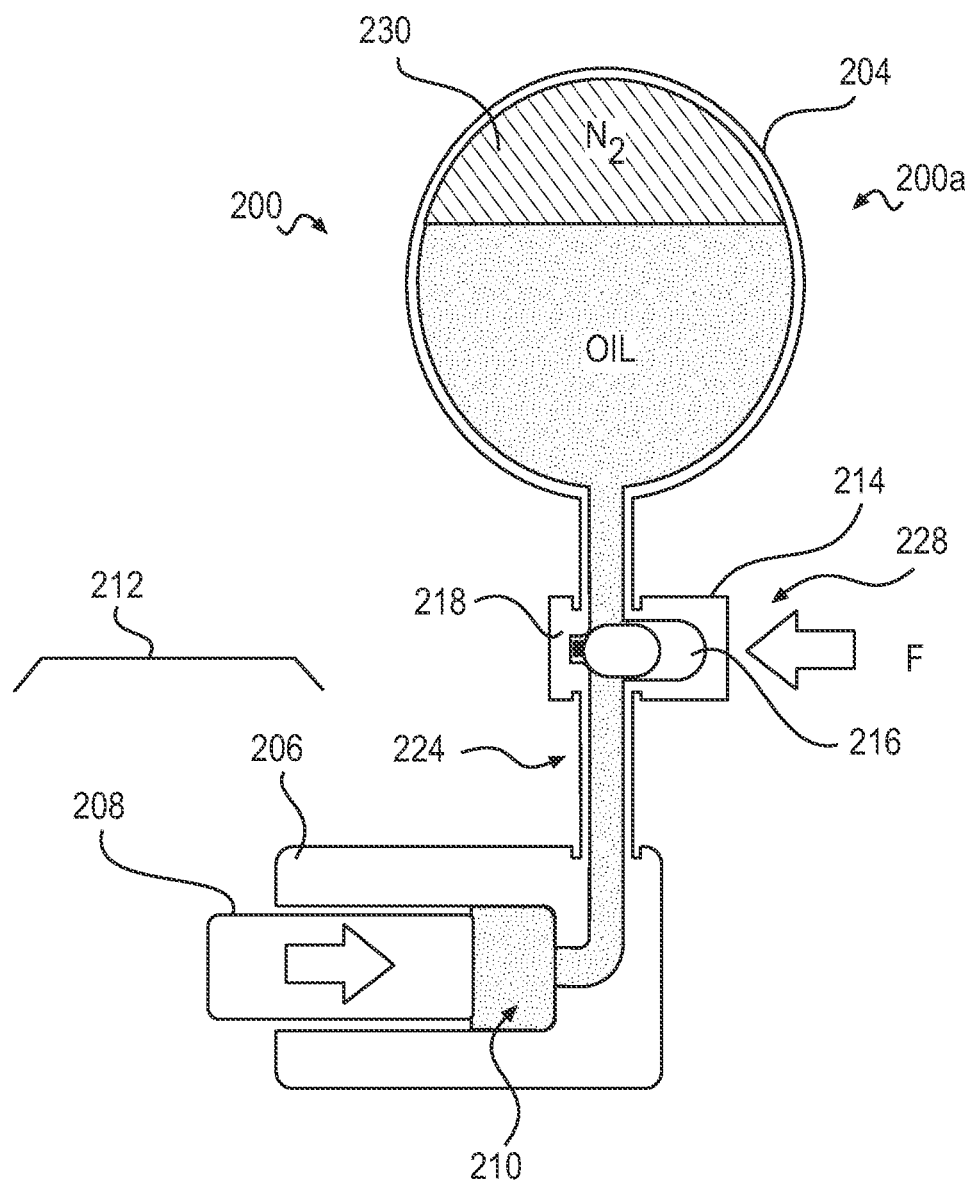
Figure 7:
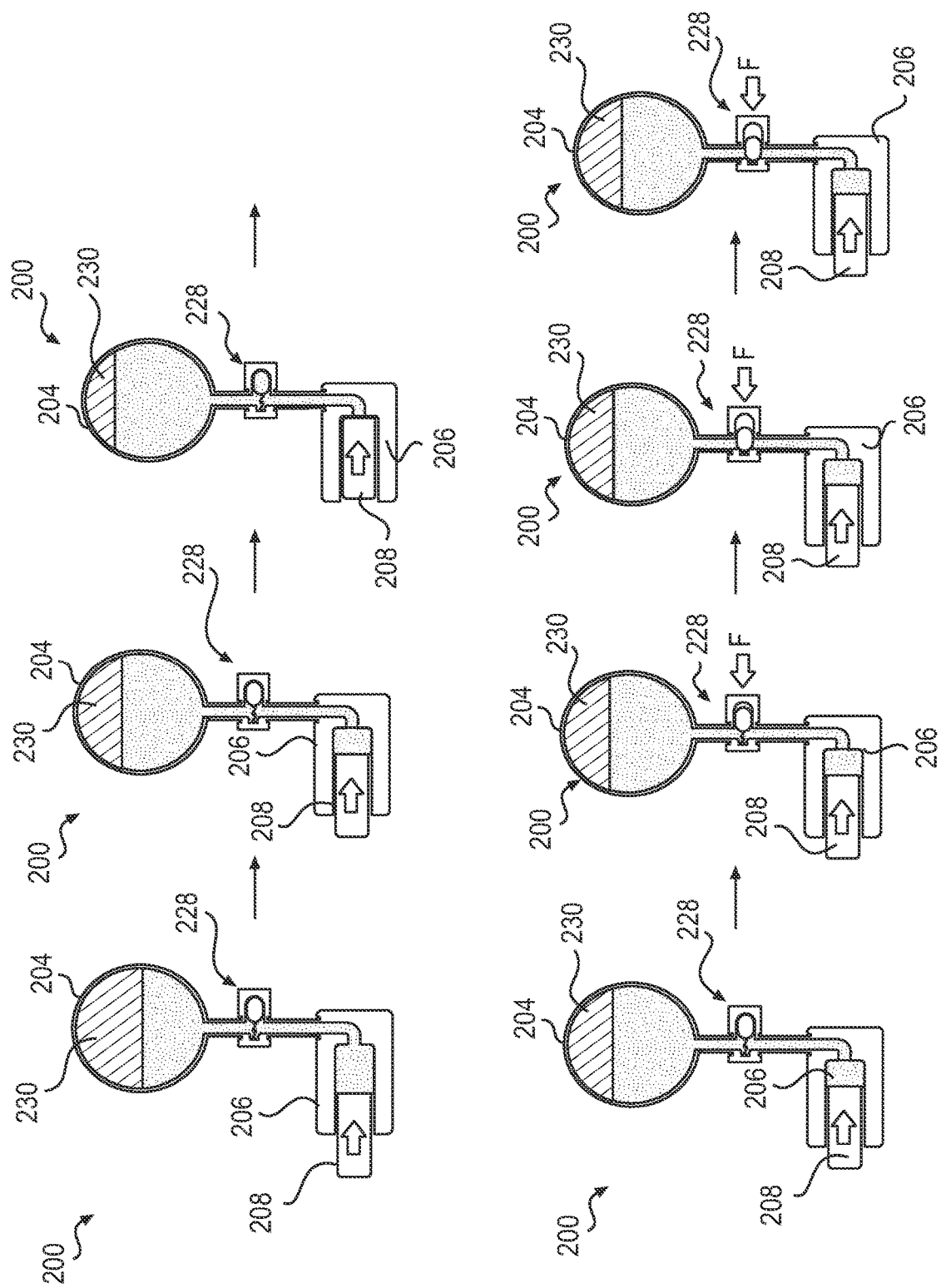
FIG. 7 is a schematic view of an exemplary functioning of the dynamic tensioner locking device.

Upon occurrence of a triggered inertial event, such as the braking, or deceleration of the vehicle, the actuator, such as the ball 216, laterally move in the conduit to interrupt the fluid flow path (FIGS. 6E-F). Thus, as the liquid fluid is trapped between the cylinder and the actuator, any movement of the piston 208 in the cylinder 206 is impossible or limited.

Figure 8:
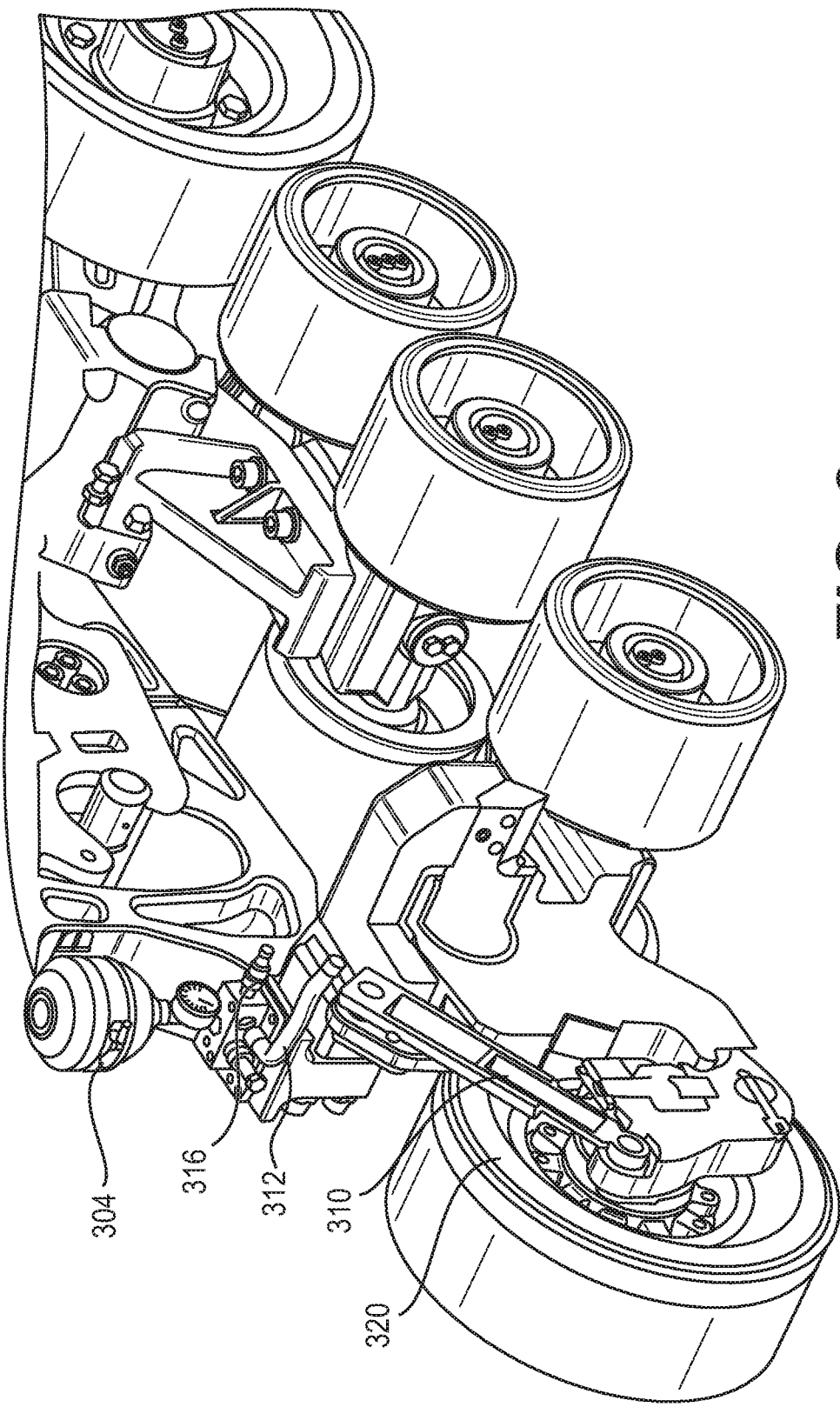
FIG. 8 is a close up view of another embodiment of a track system in accordance with the principles to the present invention, having the dynamic tensioner locking device installed thereto.

Now referring to FIG. 8, another embodiment of a dynamic tensioner locking device for a track system using a solenoid valve 316 is shown. In such an embodiment, the dynamic tensioner locking device comprises an actuator 310 and a fluid tank also referred to as an accumulator 304 operatively connected via a conduit or fluid flow path 312. An solenoid valve 316 is configured to be closed upon activation from a signal from the inertial event. Typically, the solenoid valve shall be closed based on the braking signals generated by a braking pedal or any other braking mechanism. The closing of the solenoid valve interrupts or reduces the fluid connection between the accumulator and the chamber of the cylinder.

The dynamic tensioner locking device for a track system may further comprise one or more pressure sensors monitoring the fluid pressure within various portions of the fluid reservoir.

Figure 10:
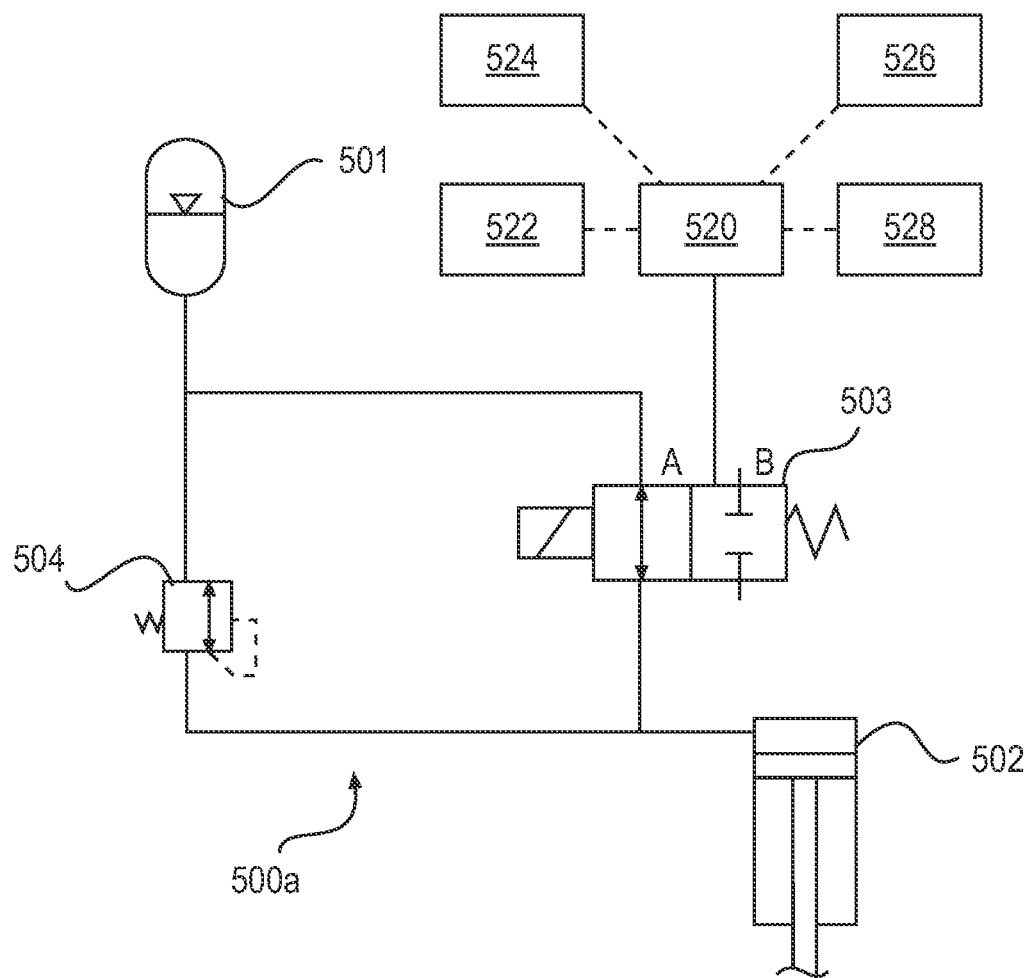
FIG. 10 is a schematic view of another embodiment of the dynamic tensioner device in accordance with the principle of the present invention.

Now referring to FIG. 10, another embodiment of the dynamic tensioner system is illustrated. The system 500a comprises the accumulator, or reservoir 501 fluidly connected to the damping element or cylinder 502. An active fluid control mean 503, such as a solenoid valve, is adapted to either allow or completely block the flow of fluid between the reservoir 501 and the cylinder 502 as to limit, preferably forbid, movement of the piston inside the cylinder. Optionally, a mean or mechanism adapted to allow flow of fluid at a predetermined pressure, such as relief valve 504, may be fluidly connected to the reservoir and to the piston. When the pressure in the system 500a reaches a given threshold, the relief valve 504 is adapted to relieve pressure to avoid system failure or damaging the equipment. The active flow control mean, such as, but not limited to, a solenoid, may be controlled by a controller 520 which receive a signal from any mechanism, such as, but not limited to a brake pedal switch 52, an accelerometer 524, one or more sensor 526 or any other switch 528.

Figure 11:
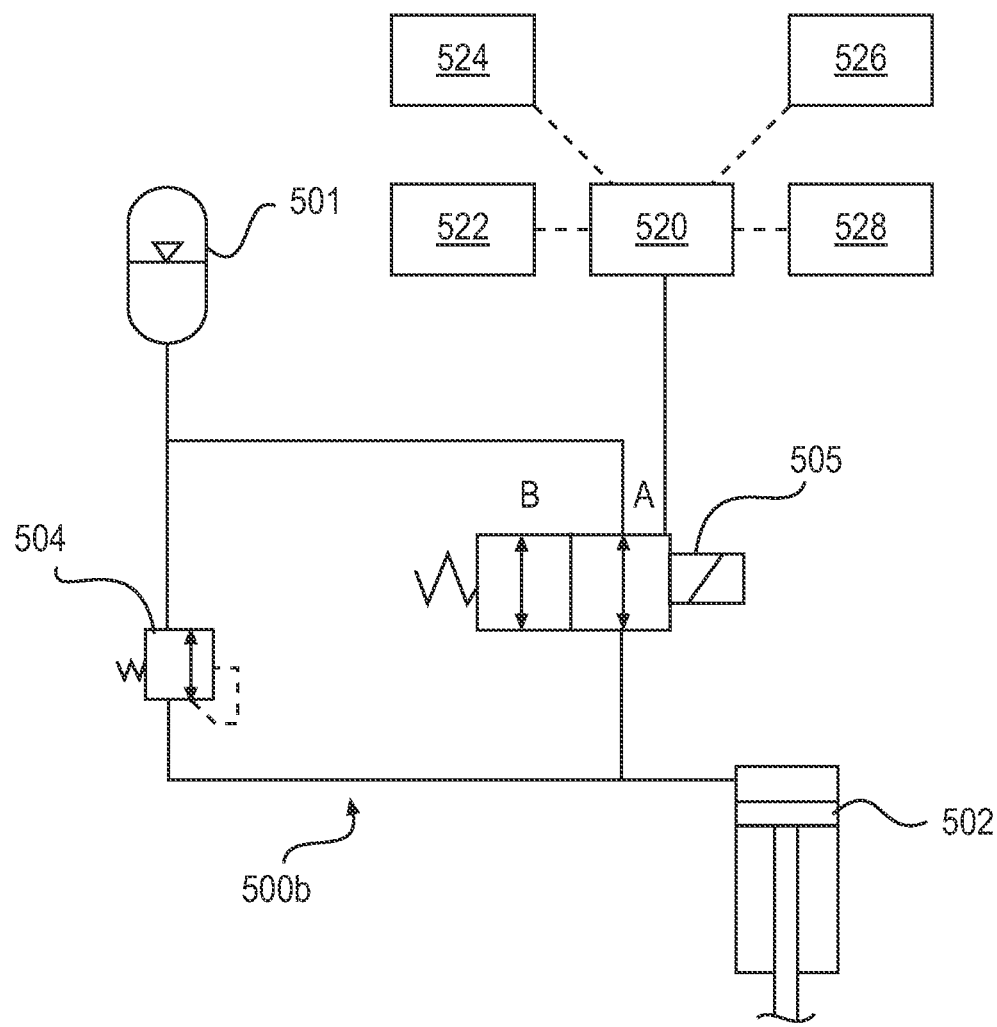
FIG. 11 is a schematic view of another embodiment of the dynamic tensioner device in accordance with the principle of the present invention.

Now referring to FIG. 11 representing a variation to the embodiment illustrated in FIG. 10. In system 500b, the active fluid control mean 505 is adapted to provide increased control or granularity of the flow of fluid. Further to totally blocking the flow, the valve 505 is able to allow a reduced flow rate by moving from a fully opened position to a partially opened or partially closed position. Understandably, the valve 505 may be adapted to move in a plurality of positions to offer greater control over the flow rate. This embodiment may further comprise a pressure relief valve 504 in the case the pressure in the system is too high.

Figure 12:
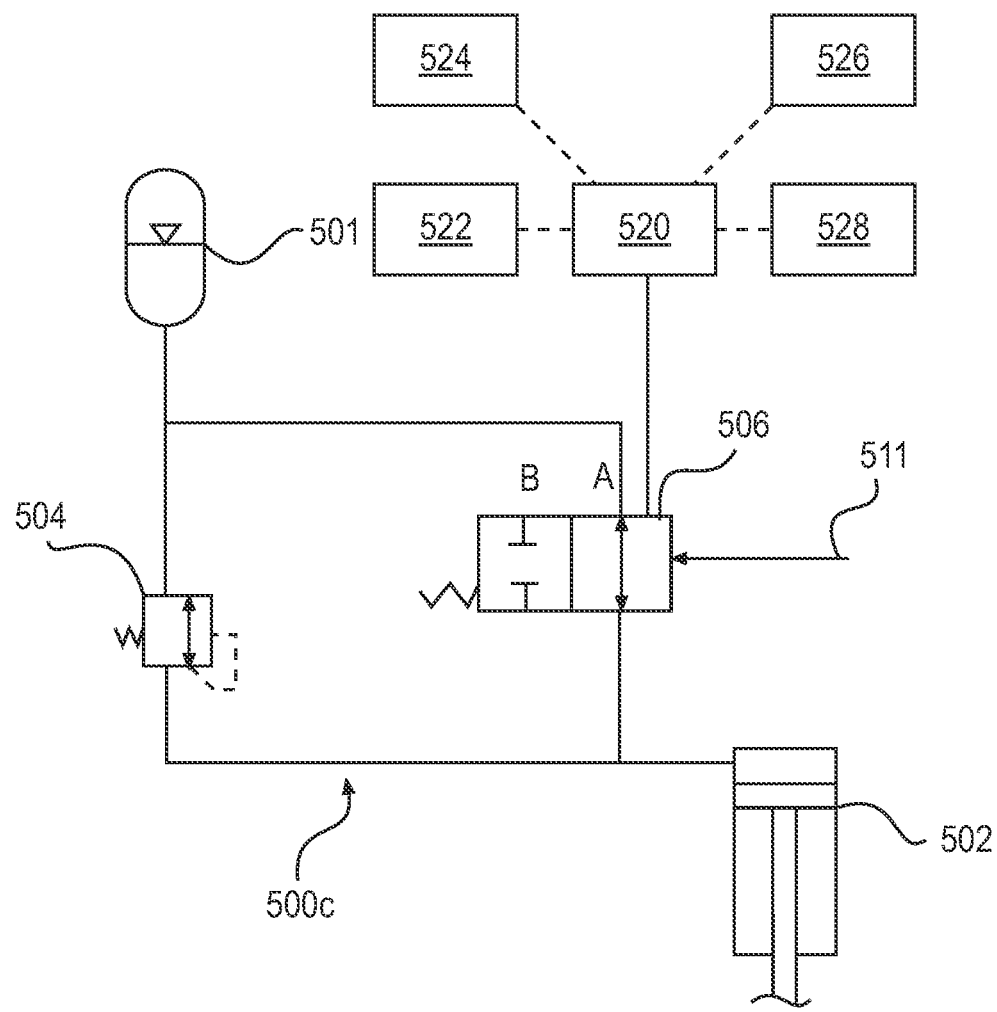
FIG. 12 is a schematic view of another embodiment of the dynamic tensioner device in accordance with the principle of the present invention.

Referring now to FIG. 12 representing a similar system 500c where the solenoid valve is replaced by an inertial valve 506. Such valve comprises a ball, or cylinder or the likes that is able to move in order to block or limit the flow of fluid between the reservoir 501 and the cylinder 502. In a situation where the track system speed is changing, the ball tends to remain at its current speed. For instance, if the vehicle is braking, the speed of the whole system 500c will diminish, but the ball, by its inertia, will temporarily remain at its original speed. The ball will thus move forward, pushed or moved by decelerating force 511, with regards to the track system as to intersect and block the fluid path and thus limit the piston's movement inside the cylinder 502. It may also be necessary for such an embodiment to include a pressure relief valve 504 to avoid excessive pressure that may damage the system.

Figure 13:
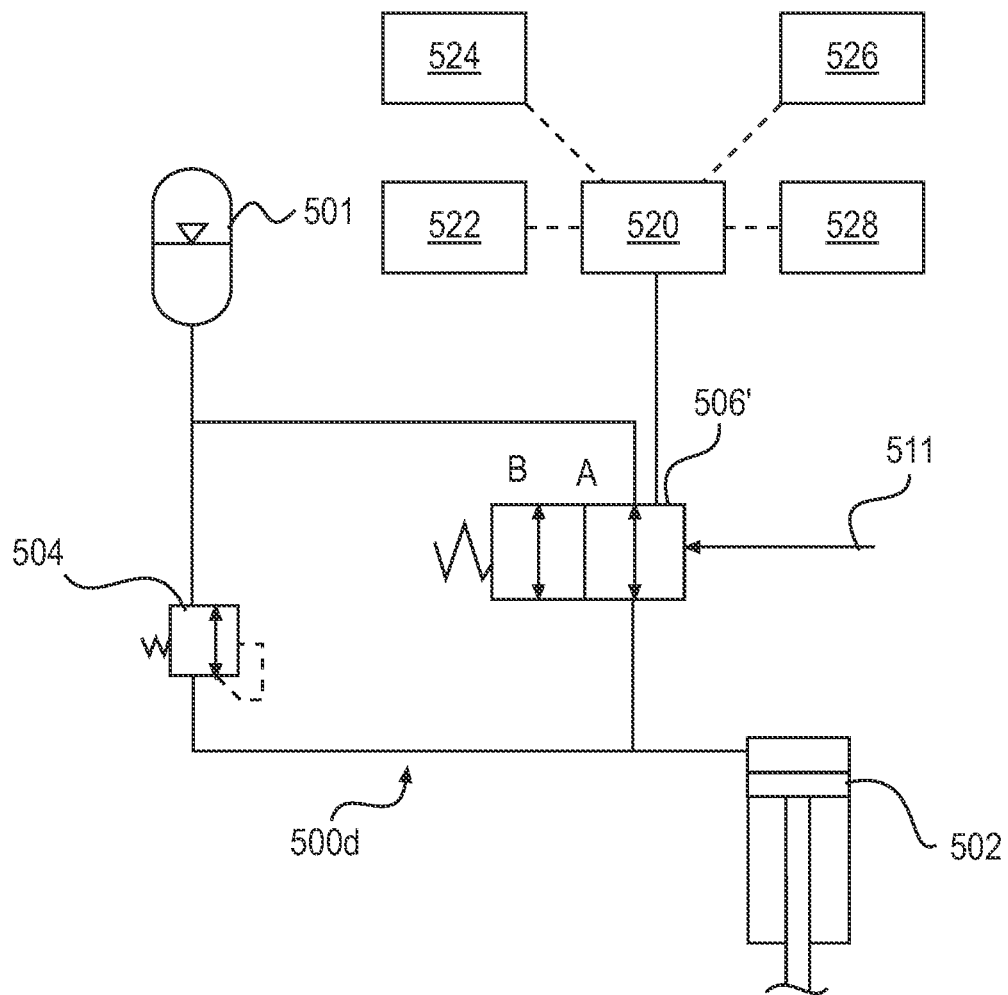
FIG. 13 is a schematic view of another embodiment of the dynamic tensioner device in accordance with the principle of the present invention.

Now referring to FIG. 13 that represents a variation of the embodiment of FIG. 12. In system 500*d*, the inertial valve 506' is able to provide two or more flow rate values. The ball or cylinder comprised in the valve 506' is able to move in one or more positions between the fully opened position and the fully closed position when a force 511 is applied on the inertial valve. As explained above, the force may come from deceleration or other event. It may be also necessary for this embodiment to comprise a pressure relief valve 504 to avoid excessive pressure that may damage the system.

Figure 14:
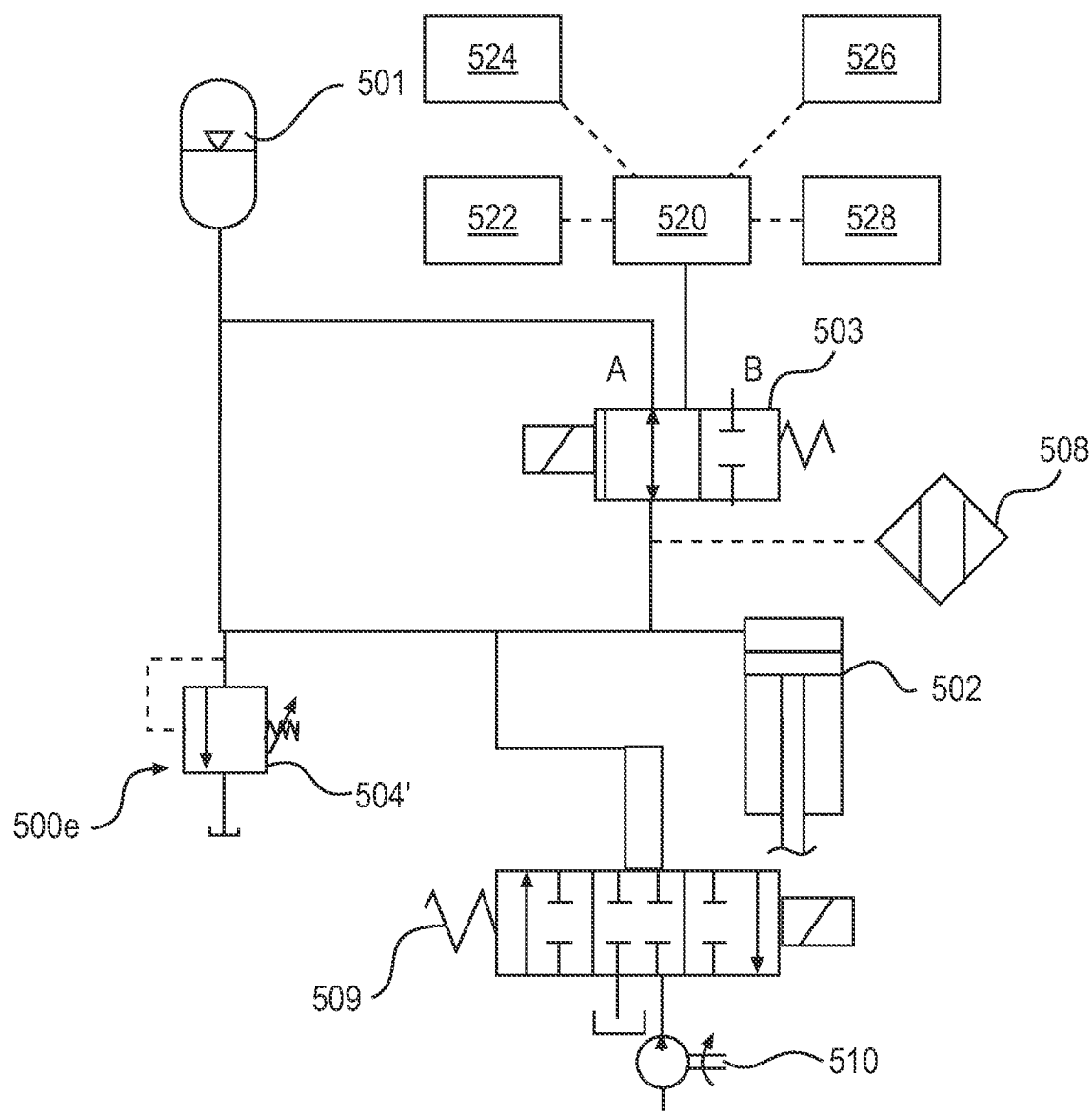
FIG. 14 is a schematic view of another embodiment of the dynamic tensioner device in accordance with the principle of the present invention.

Another embodiment is schematically illustrated in FIG. 14. In this case, the system 500*e* [[may]] further comprises a relief valve 504', a manifold 509 and a hydraulic pump 510. The combination thereof is adapted to add or remove fluid from the system 500*e* to either harden or soften the tensioner 502. An increased tension in the track system aims at further limiting the ratcheting of the track while braking. The system 500*e* may also comprise an analogical sensor 508 adapted to trigger the hydraulic pump 510 when necessary. The system 500*e* is provided with the solenoid valve 503, but any other valve such as the inertial valve 506 may be used.

Now referring to all figures illustrating embodiments using a solenoid valve. The solenoid valve may be triggered from a plurality of mechanisms. For instance, a switch 522 may be operatively connected to the brake pedal of the vehicle. In another embodiment, the switch 522 may be installed inside the vehicle's cabin and within hand reach of the operator so he can activate the valve in an emergency braking situation. Furthermore, an accelerometer 524 may be operatively connected to the solenoid valve to trigger the latter when acceleration reaches a given threshold. An inertial system may also be used. Such system may comprise an element that is free to move with regards to the vehicle. Upon acceleration, said element will trigger the solenoid. Understandably, any other system adapted to detect a change of speed of a vehicle may be used to trigger the valve.

According to one embodiment, an external control system may actively or automatically controls the position of the idler wheel 320 and thus a tension of the track. Furthermore, the track tensioning system of the present invention may employ a manual controller that provides a drive command to the idler wheel for manually establishing, for example, a high and/or a low tension or the track. As such, in an active control embodiment, an external control system would block or lock the variable tensioner to limit is variation in response to a selected event. For instance, the external system could be configured to actuate the dynamic tensioning function upon braking of the vehicle.

Understandably, the dynamic tensioner locking device for a track system may function on a variety of different track system as long as the tension is controlled by the movement of a wheel. As such, the dynamic tensioner locking device for a track system could be installed on a split frame track system as shown in FIG. 9. Other embodiment could also be configured for various frame assembly without departing from the principles of the present invention.

Still referring to FIG. 8, in case of a braking event, the valve closes. In the closed condition, either the flow stops or barely circulates as to prevent, or limit, the track tensioner to compress. The objective is to prevent the endless track to ratchet by keeping the endless track perimeter equal or shorter than the track system perimeter.

The valve may close either when an electric signal is sent by the operator in a braking event or upon movement of an inertial device, such as a ball. Also, the electric signal may also be triggered by an inertial device.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A tensioning system for an endless track system, the endless track system having a frame, an idler wheel assembly and an endless track extending around the frame and the idler wheel assembly, the idler wheel assembly being movable with respect to the frame for tensioning the endless track, the tensioning system comprising:
  a tensioner operatively connectable between the frame and the idler wheel assembly of the endless track system for controlling relative movement between the frame and the idler wheel assembly and for applying tension to the endless track, the tensioner including:
    a cylinder; and
    a piston that is reciprocally movable within the cylinder between an extended position and a retracted position, the piston sealingly engaging the cylinder for forming a variable volume chamber containing a liquid, the piston being movable between the extended position and the retracted position in a plurality of intermediate positions by changing a volume of the liquid;
  a reservoir fluidly connected to the chamber of the cylinder, the reservoir simultaneously containing the liquid or a portion thereof and a gas, the gas in the reservoir being under pressure and applying hydrostatic pressure to the liquid tending towards an increase in the volume of liquid within the chamber of the cylinder, biasing the piston towards the extended position, biasing the idler wheel assembly against the endless track;
  a conduit fluidly connecting the cylinder to the reservoir allowing the liquid to flow between the chamber of the cylinder and the reservoir to change the volume of liquid within the chamber of the cylinder to move the piston within the chamber of the cylinder; and
  a valve disposed along the conduit for controlling liquid flow through the conduit, the valve being movable between:
    an open position in which the liquid is allowed to flow between the chamber of the cylinder and the reservoir, rendering the piston movable within the chamber and allowing for relative movement between the frame and the idler wheel assembly;
    a closed position in which the liquid is prevented from flowing between the chamber of the cylinder and the reservoir, rendering the piston immovable within the chamber and preventing relative movement between the frame and the idler wheel assembly; and
    a plurality of intermediate positions between the open and closed positions, the plurality of intermediate positions providing a plurality of liquid flow rates within the conduit, thereby rendering the piston movable within the chamber of the cylinder at a plurality of speeds.

2. The tensioning system of claim 1, wherein the valve is a solenoid valve movable between the open position, the plurality of intermediate positions, and the closed position upon reception of an electronic signal.

3. The tensioning system of claim 1, further comprising an accelerometer triggering an electronic signal in response to an acceleration of the endless track system in a predetermined direction exceeding a predetermined acceleration threshold, and wherein the valve is a solenoid valve movable between the open position, the plurality of intermediate positions, and the closed position upon reception of the electronic signal from the accelerometer.

4. The tensioning system of claim 1, further comprising a user-controllable switch for selectively triggering an electronic signal, and wherein the valve is a solenoid valve movable between the open and closed positions upon reception of the electronic signal from the switch.

5. The tensioning system of claim 1, wherein at least one of the reservoir, the chamber of the cylinder and the conduit further comprises a relief valve for releasing an amount of gas or liquid from the at least one of the reservoir, the chamber of the cylinder and the conduit when a predetermined pressure threshold is exceeded.

6. A method for controlling a tension in an endless track disposed around a plurality of wheels pivotally mounted on a support frame of a track system, the track system being operatively mounted to a vehicle, at least one of the plurality of wheels being operatively mounted to a dynamic tensioner, the dynamic tensioner comprising a fluid-based suspension element, the fluid-based suspension element being operatively mounted between the support frame and the at least one of the plurality of wheels so as to displace the at least one of the plurality of wheels relative to the support frame in order to control the tension in the endless track, the fluid-based suspension element comprising:
  a cylinder;
  a piston that is reciprocally movable within the cylinder between an extended position and a retracted position, the piston sealingly engaging the cylinder for forming a variable volume chamber containing a liquid, the piston being movable between the extended position and the retracted position in a plurality of intermediate positions by changing a volume of the liquid contained within the chamber of the cylinder;
  a reservoir fluidly connected to the chamber of the cylinder, the reservoir simultaneously containing the liquid or a portion thereof and a gas, the gas in the reservoir being under pressure and applying hydrostatic pressure to the liquid tending towards an increase in the volume of liquid within the chamber of the cylinder, biasing the piston towards the extended position;
  a conduit fluidly connecting the cylinder to the reservoir such that the liquid is displaceable between the chamber of the cylinder and the reservoir;
  a solenoid valve disposed in the conduit for controlling a flow of liquid in the conduit, the solenoid valve being movable between an open position, a plurality of intermediate positions, and a closed position; and
  a switch operatively connected to the solenoid valve, the switch being configured for moving the solenoid valve between the open position, the plurality of intermediate positions and the closed position when an acceleration of the track system reaches a predetermined value;
the method comprising:
  determining the acceleration of the track system;
  when the acceleration of the track system reaches the predetermined value, moving the solenoid valve in the closed position for substantially maintaining a length of the dynamic tensioner; and
  when the acceleration of the track system is below the predetermined value, moving the solenoid valve in the open position or in one of the plurality of intermediate positions for allowing variation of the length of the dynamic tensioner.

7. The method of claim 6, wherein the method further comprises manually engaging the switch to move the solenoid valve between the open position, the plurality of intermediate positions, and the closed position.

8. A method for controlling a tension in an endless track disposed around a plurality of wheels pivotally mounted on a support frame of a track system, the track system being operatively mounted to a vehicle, at least one of the plurality of wheels being operatively mounted to a dynamic tensioner, the dynamic tensioner including a fluid-based suspension element, the fluid-based suspension element being operatively mounted between the support frame and the at least one of the plurality of wheels so as to displace the at least one of the plurality of wheels relative to the support frame in order to control the tension in the endless track, the fluid-based suspension element including:
  a cylinder;
  a piston that is reciprocally movable within the cylinder between an extended position and a retracted position, the piston sealingly engaging the cylinder for forming a variable volume chamber containing a liquid, the piston being movable between the extended position and the retracted position in a plurality of intermediate positions by changing a volume of the liquid contained within the chamber of the cylinder;
  a reservoir fluidly connected to the chamber of the cylinder, the reservoir simultaneously containing the liquid or a portion thereof and a gas, the gas in the reservoir being under pressure and applying hydrostatic pressure to the liquid tending towards an increase in the volume of liquid within the chamber of the cylinder, biasing the piston towards the extended position;
  a conduit fluidly connecting the cylinder to the reservoir such that the liquid is displaceable between the chamber of the cylinder and the reservoir; and
  a solenoid valve disposed in the conduit for controlling a flow of liquid in the conduit, the solenoid valve being movable between an open position, a plurality of intermediate positions, and a closed position;
  a controller operatively connected to the solenoid valve; and
  at least one of a switch and an accelerometer operatively connected to the controller, the at least one of the switch and the accelerometer providing a signal to the controller when an acceleration of the track system reaches a predetermined value;
the method comprising:
  determining the acceleration of the track system;
  when the acceleration of the track system reaches the predetermined value:
    providing the signal to the solenoid valve of the dynamic tensioner via the controller for moving the solenoid valve in the closed position for substantially maintaining a length of the dynamic tensioner;
  when the acceleration of the track system is below the predetermined value:
    providing the signal to the solenoid valve of the dynamic tensioner via the controller for moving the solenoid valve in the open position or in one of the plurality of intermediate positions for allowing variation of the length of the dynamic tensioner.

9. The method of claim 8, wherein the method further comprises manually engaging the switch to generate the signal.

* * * * *